(12) United States Patent
Isahaya et al.

(10) Patent No.: US 11,021,571 B2
(45) Date of Patent: *Jun. 1, 2021

(54) MANUFACTURING METHOD FOR HIGH MOLECULAR WEIGHT AROMATIC POLYCARBONATE RESIN

(71) Applicant: MITSUBISHI GAS CHEMICAL COMPANY, INC., Tokyo (JP)

(72) Inventors: Yoshinori Isahaya, Tokyo (JP); Atsushi Hirashima, Tokyo (JP); Hidefumi Harada, Tokyo (JP); Maki Ito, Tokyo (JP); Jun-ya Hayakawa, Tokyo (JP); Takehiko Isobe, Tokyo (JP); Yousuke Shinkai, Tokyo (JP); Keisuke Shimokawa, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 76 days.

This patent is subject to a terminal disclaimer.

(21) Appl. No.: 16/088,574

(22) PCT Filed: Mar. 24, 2017

(86) PCT No.: PCT/JP2017/011942
§ 371 (c)(1),
(2) Date: Sep. 26, 2018

(87) PCT Pub. No.: WO2017/170197
PCT Pub. Date: Oct. 5, 2017

(65) Prior Publication Data
US 2020/0216611 A1    Jul. 9, 2020

(30) Foreign Application Priority Data

Mar. 30, 2016 (JP) .............................. JP2016-068720

(51) Int. Cl.
*C08G 64/04* (2006.01)
*C08G 64/30* (2006.01)

(52) U.S. Cl.
CPC .......... *C08G 64/305* (2013.01); *C08G 64/04* (2013.01)

(58) Field of Classification Search
USPC ................ 528/196, 198, 271, 272, 273, 274
See application file for complete search history.

(56) References Cited

U.S. PATENT DOCUMENTS

| | | | |
|---|---|---|---|
| 2014/0206826 A1 | 7/2014 | Isahaya et al. | |
| 2014/0371404 A1 | 12/2014 | Isahaya et al. | |
| 2015/0133611 A1 | 5/2015 | Isahaya et al. | |
| 2015/0267006 A1 | 9/2015 | Isahaya et al. | |
| 2015/0274887 A1 | 10/2015 | Isahaya et al. | |
| 2016/0272757 A1* | 9/2016 | Isahaya | C08G 64/205 |
| 2019/0092901 A1* | 3/2019 | Isahaya | C08G 64/06 |
| 2019/0119441 A1* | 4/2019 | Isahaya | C08G 64/305 |

FOREIGN PATENT DOCUMENTS

| | | |
|---|---|---|
| JP | 2000-212270 | 8/2000 |
| JP | 2001-226478 | 8/2001 |
| JP | 2010-235940 | 10/2010 |
| JP | 2010-235941 | 10/2010 |
| JP | 2015-189905 | 11/2015 |
| WO | 2012/15776 | 11/2012 |
| WO | 2013/100072 | 7/2013 |
| WO | 2013/172317 | 11/2013 |
| WO | 2014/077342 | 5/2014 |
| WO | 2014/077350 | 5/2014 |
| WO | 2015/072473 | 5/2015 |

OTHER PUBLICATIONS

U.S. Appl. No. 15/032,763 to Isahaya et al., filed Apr. 28, 2016.
U.S. Appl. No. 14/368,043 to Isahaya et al., filed Jun. 23, 2014.
U.S. Appl. No. 14/400,640 to Isahaya et al., filed Nov. 12, 2014.
U.S. Appl. No. 14/442,911 to Isahaya et al., filed May 14, 2015.
U.S. Appl. No. 14/441,939 to Isahaya et al., filed May 11, 2015.
U.S. Appl. No. 14/118,439 to Isahaya et al., filed Nov. 18, 2013.
International Search Report in International Patent Application No. PCT/JP2017/011942, dated May 16, 2017.
International Preliminary Report on Patentability in International Patent Application No. PCT/JP2017/011942, dated Oct. 2, 2018.

* cited by examiner

*Primary Examiner* — Terressa Boykin
(74) *Attorney, Agent, or Firm* — Greenblum & Bernstein, P.L.C.

(57) ABSTRACT

Provided is a manufacturing method for a high molecular weight aromatic polycarbonate resin that has superior fluidity and for which a good color and a sufficiently high molecular weight can be achieved. A manufacturing method for a high molecular weight aromatic polycarbonate resin includes: a step in which a dialcohol compound expressed by general formula (1) and a catalyst are mixed to obtain a catalyst composition; a step in which the obtained catalyst composition is kept in a molten state, and is mixed with an aromatic polycarbonate prepolymer within ten hours after obtaining the catalyst composition, to obtain a prepolymer mixture; and a high molecular weight achievement step in which the obtained prepolymer mixture is heat-treated under reduced pressure conditions to obtain a high molecular weight aromatic polycarbonate resin.

20 Claims, 1 Drawing Sheet

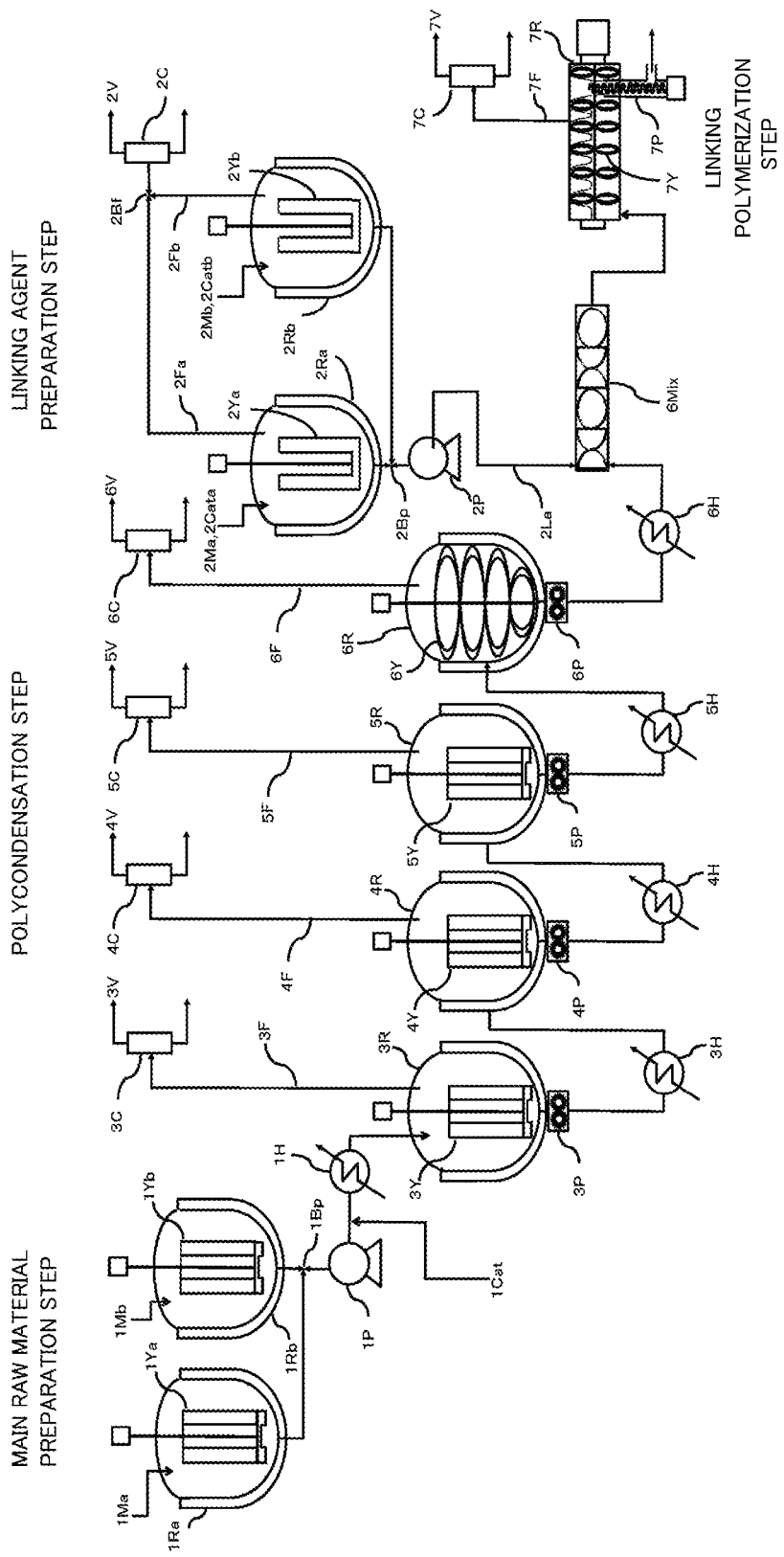

MANUFACTURING METHOD FOR HIGH MOLECULAR WEIGHT AROMATIC POLYCARBONATE RESIN

TECHNICAL FIELD

The present invention relates to a manufacturing method for a high molecular weight aromatic polycarbonate resin.

BACKGROUND ART

Polycarbonate resins have been widely used in a wide variety of fields due to their excellent heat resistance, impact resistance and transparency. Many studies have been carried out conventionally for manufacturing methods for polycarbonate resins. For example, manufacturing methods for high molecular weight polycarbonate resins including a step, in which an aromatic polycarbonate prepolymer is reacted with an aliphatic diol compound having a particular structure (a linking agent) in the presence of a transesterification catalyst to make the molecular weight high, and at least a part of a cyclic carbonate which is produced as a byproduct in the high molecular weight achievement step is removed to the outside of the reaction system, have been disclosed, and it is said that such methods can achieve sufficiently high molecular weight while good quality of aromatic polycarbonate resins is maintained (e.g. see Patent Literature 1).

CITATION LIST

Patent Literature

Patent Literature 1: WO 2012/157766

SUMMARY OF INVENTION

Technical Problem

In general, in a manufacturing method for a high molecular weight aromatic polycarbonate resin by a melting method, color, fluidity and the like of the obtained resin may be deteriorated, and it may become difficult to achieve a sufficiently high molecular weight.

Therefore, a technical problem in the present invention is to provide a manufacturing method for a high molecular weight aromatic polycarbonate resin that has excellent fluidity and that can achieve good color and a sufficiently high molecular weight.

Solution to Problem

As a result of diligent research to solve the problems described above, the inventors of the present invention found that the problems described above can be solved by supplying a catalyst used to achieve a high molecular weight by a particular feeding method, in the manufacturing method including a reaction that makes an aromatic polycarbonate prepolymer have a high molecular weight by reacting an aromatic polycarbonate prepolymer with a dialcohol compound in the presence of an transesterification catalyst (hereinafter, also referred to as "a linking and high molecular weight achievement reaction"), and thus completed the present invention. The specific means for solving the problem described above is as follows, and the present invention includes the following aspects.

[1] A manufacturing method for a high molecular weight aromatic polycarbonate resin, the method comprising: a step of mixing a dialcohol compound represented by General Formula (1) below and a catalyst to produce a catalyst composition in a liquid form, a step of mixing the catalyst composition in a liquid form and an aromatic polycarbonate prepolymer within a period of 10 hours from the time of production of the catalyst composition to obtain a prepolymer mixture, and a high molecular weight achievement step of heat-treating the obtained prepolymer mixture under reduced pressure conditions to obtain a high molecular weight aromatic polycarbonate resin;

[Chemical Formula 1]

In General Formula (1), $R^1$ to $R^4$ each independently represent a hydrogen atom, a halogen atom, or a linear or branched alkyl group having 1 to 5 carbons. Q represents a single bond or a substituted or unsubstituted divalent group comprising at least one member selected from the group consisting of an aliphatic group, an aromatic group, an oxygen atom, a sulfur atom, a sulfone group, a sulfoxide group, a carbonyl group, a dialkylsilyl group and a diarylsilyl group.

[2] The manufacturing method according to [1], where the step of producing the catalyst composition is performed separately in parallel in a plurality of catalyst composition preparation tanks.

[3] The manufacturing method according to [1] or [2], where a molten state of the catalyst composition is maintained in a temperature range from a temperature that is 5° C. higher than a melting point of the dialcohol compound to a temperature that is 250° C. higher than the melting point.

[4] The manufacturing method according to any one of [1] to [3], where the catalyst is at least one member selected from the group consisting of alkali metal salts and alkaline earth metal salts.

[5] The manufacturing method according to any one of [1] to [4], where the step of producing the catalyst composition is performed in a catalyst composition preparation tank comprising a surface in contact with the catalyst composition, and the surface has an iron content of 80 mass % or less.

[6] The manufacturing method according to any one of [1] to [5], where the step of producing the catalyst composition is performed in an atmosphere having an oxygen content of 10 vol % or less.

Advantageous Effects of Invention

The present invention can provide a manufacturing method for a high molecular weight aromatic polycarbonate resin that has excellent fluidity and that can achieve good color and a sufficiently high molecular weight.

BRIEF DESCRIPTION OF DRAWINGS

FIG. 1 is a schematic view illustrating an example of manufacturing apparatuses used in the manufacturing method of an embodiment of the present invention.

DESCRIPTION OF EMBODIMENTS

In the present specification, the term "step" includes, in addition to an independent step, the case where a step cannot be accurately distinguished from another step as long as the step achieves a predetermined purpose of the step. Furthermore, the numerical range described by using " . . . to . . . " indicates a range including the numerical values written before and after "to" as the minimum value and the maximum value, respectively. Furthermore, when a plurality of substances that correspond to each component are present in a composition, the content of the each component in the composition means the total amount of the plurality of substances present in the composition unless otherwise noted.

Manufacturing method for high molecular weight aromatic polycarbonate resin

The manufacturing method for a high molecular weight aromatic polycarbonate resin of the present embodiment includes: a step of mixing a dialcohol compound represented by General Formula (1) below and a catalyst to produce a catalyst composition in a liquid form (hereinafter, also referred to as "a first step"), a step of mixing the catalyst composition in a liquid form and an aromatic polycarbonate prepolymer (hereinafter, also simply referred to as "a prepolymer") within a period of 10 hours from the time of production of the catalyst composition, to obtain a prepolymer mixture (hereinafter, also referred to as "a second step"), and a high molecular weight achievement step of heat-treating the obtained prepolymer mixture under reduced pressure conditions to obtain a high molecular weight aromatic polycarbonate resin (hereinafter, also referred to as "a third step").

[Chemical Formula 2]

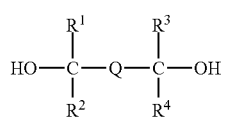

(1)

In General Formula (1), $R^1$ to $R^4$ each independently represent a hydrogen atom, a halogen atom, or a linear or branched alkyl group having 1 to 5 carbons. Q represents a single bond or a substituted or unsubstituted divalent group comprising at least one member selected from the group consisting of an aliphatic group, an aromatic group, an oxygen atom, a sulfur atom, a sulfone group, a sulfoxide group, a carbonyl group, a dialkylsilyl group and a diarylsilyl group.

In the manufacturing method of the present embodiment, a high molecular weight aromatic polycarbonate resin having achieved a high molecular weight with a desired molecular weight can be efficiently produced while coloring of the produced high molecular weight aromatic polycarbonate resin is efficiently suppressed, by preparing a catalyst composition in a liquid form which is a mixture of a catalyst and a dialcohol compound and by adjusting to a predetermined range the period of time taken from the preparation to mixing the catalyst composition in a liquid form with a prepolymer. Furthermore, by achieving a high molecular weight of the prepolymer by using the catalyst composition, generation of heterologous structures can be further suppressed, and a high molecular weight aromatic polycarbonate resin that has a low N value (structural viscosity index) and an excellent quality in fluidity can be economically advantageously produced.

It is possible to consider this as follows, for example. When the catalyst composition is stored in a liquid form for a time period exceeding a predetermined time period, it is conceived that the obtained high molecular weight aromatic polycarbonate may be colored due to the deterioration progress of the diol compound contained by the catalyst composition, and it may become difficult to achieve a predetermined molecular weight because, for example, a high molecular weight achievement reaction does not sufficiently proceed due to occurrence of a cleavage (fragmentation) reaction of a prepolymer main chain.

Furthermore, by supplying a catalyst composition, which is produced by mixing a catalyst that promotes the high molecular weight achievement reaction (hereinafter, also simply referred to as "a catalyst") with a dialcohol compound, to an aromatic polycarbonate prepolymer, it becomes easier to stably supply the catalyst and the dialcohol compound, and it is possible to supply the catalyst with excellent dispersibility. By this, the generation of heterologous structures is effectively suppressed and, furthermore, the occurrence of a cleavage (fragmentation) reaction of the prepolymer main chain is effectively suppressed, thereby shortening the time required for the linking and high molecular weight achievement reaction. Furthermore, local increase of concentration of the catalyst in the prepolymer mixture can be suppressed, and generation of heterologous structure in the prepolymer itself can be efficiently suppressed. Furthermore, when the catalyst is added, occurrence of side reactions, fluctuation of reaction conditions (e.g. decrease in degree of pressure reduction in a reactor) and the like caused by a component that does not contribute to the reaction can be suppressed because there is no need for dilution with water, an organic solvent and the like, and thus the linking and high molecular weight achievement reaction can proceed more efficiently while the generation of heterologous structures is suppressed.

In conventional melting methods, there are cases where a catalyst is mixed with a solvent, such as an organic solvent, or an aromatic monohydroxy compound (phenol compound) which is a raw material of a prepolymer and then added. However, in the conventional methods, a long period of time may be required for achieving a high molecular weight, and the high molecular weight may not be sufficiently achieved. Furthermore, when a catalyst is mixed with the prepolymer and then used as a master batch, the catalyst is present in a high concentration during the preparation of the master batch, and reduction of the molecular weight may occur due to this. On the other hand, in the present embodiment, the problem of molecular weight reduction occurred in conventional techniques can be solved by using the catalyst after the catalyst is mixed with a dialcohol compound.

The manufacturing method for a high molecular weight aromatic polycarbonate resin may be a continuous method in which the first step, the second step and the third step are performed continuously, may be a batch method in which each step is performed independently, and may be a combination of a batch method and a continuous method in which at least two of these steps are continuously performed.

First Step

In the first step, a catalyst composition in a liquid form is produced by mixing a dialcohol compound represented by General Formula (1) and a catalyst. By mixing the first catalyst, as a catalyst composition, with an aromatic polycarbonate prepolymer, the first catalyst can be uniformly distributed in the obtained prepolymer mixture. Note that "in a liquid form" means the condition where the catalyst composition has fluidity and, for example, has the viscosity of 1,000 Pa·s or less.

Details of the dialcohol compound and the catalyst contained by the catalyst composition are described below.

The method of mixing the dialcohol compound and the catalyst in the step of producing the catalyst composition is not particularly limited. Examples of the method of mixing include methods in which the dialcohol compound and the catalyst are directly mixed, methods in which the catalyst is dissolved or dispersed in a solvent to prepare a catalyst solution or dispersion and this is mixed with the dialcohol compound, and the like. Among these, a method in which the catalyst solution or dispersion is mixed with the dialcohol compound is preferable.

The solvent used in the preparation of the catalyst solution or dispersion is not particularly limited as long as the solvent is a solvent that can dissolve at least a part of the catalyst. Among these, the solvent is preferably a solvent that can be handled at an ordinary temperature, that has low reactivity, and that has a boiling point appropriate for removal by devolatilization.

As the solvent, for example, an organic solvent, including an alcohol solvent, such as methanol, ethanol and isopropyl alcohol; a ketone solvent, such as acetone and methyl ethyl ketone; an ether solvent, such as diethyl ether and diisopropyl ether; an aliphatic hydrocarbon solvent, such as pentane, hexane and heptane; an aromatic hydrocarbon solvent, such as benzene, toluene and xylene; a halogenated hydrocarbon solvent, such as dichloromethane and chloroform; and the like, a phenol compound, water, and a mixture of thereof can be used.

In the solvent, the content of a metal component is preferably low. The content of the metal component in the solvent is more preferably, for example, 10 ppm or less as an alkali metal, 3 ppm or less as iron of a heavy metal, 2 ppm or less as nickel, and 1 ppm or less as chromium. For example, when water is used as the solvent, use of ion-exchanged water or distilled water is preferable.

The concentration of the catalyst in the catalyst solution or dispersion can be selected appropriately and, for example, may be 0.0005 mol/L to 0.05 mol/L, and preferably 0.001 mol/L to 0.01 mol/L.

The step of producing the catalyst composition may be performed at room temperature or may be performed with heating as long as the catalyst composition can be obtained in a liquid form. When the heating is performed, the temperature of the produced catalyst composition may be, for example, set to a temperature that is not lower than the melting point of the dialcohol compound, and is preferably set to a temperature that is not lower than the melting point but not higher than the temperature 80° C. higher than the melting point, and more preferably set to a temperature that is not lower than the melting point but not higher than the temperature 50° C. higher than the melting point.

The step of producing the catalyst composition may be performed at normal pressure, at a pressure higher than the normal pressure, or at a pressure lower than the normal pressure.

The atmosphere in the step of producing the catalyst composition is not particularly limited and can be selected appropriately from typically used atmospheres depending on the purpose and the like. The atmosphere of the first step may be any of an air atmosphere and an inert gas atmosphere. From the perspective of achieving superior quality such as color and a predetermined molecular weight even faster, the oxygen concentration is preferably 10 vol % or less, and more preferably 5 vol % or less. Examples of the inert gas include noble gases, such as argon, nitrogen and the like.

The step of producing the catalyst composition preferably further contains a step of producing a catalyst composition by performing dehydration treatment or devolatilization treatment. By subjecting the catalyst composition to dehydration treatment or devolatilization treatment, the catalyst composition is in dried condition where the content of water, organic solvents and the like has been reduced, and thus the high molecular weight achievement reaction can be performed more efficiently. Furthermore, an even more uniform catalyst composition can be formed and more stably fed, and thus more stable production operation is possible. Because of these, a high molecular weight aromatic polycarbonate resin with even higher quality can be produced with higher productivity.

The dehydration treatment or the devolatilization treatment may be performed at the time when the dialcohol compound and the catalyst are mixed or may be performed after the mixing.

The dehydration treatment or the devolatilization treatment is not particularly limited as long as at least a part of water and other volatile components, except the dialcohol compound and the catalyst, contained by the catalyst composition can be removed. The dehydration treatment or the devolatilization treatment can be appropriately selected from typically used dehydration or devolatilization methods.

Specific examples of the dehydration treatment or the devolatilization treatment include methods in which the catalyst composition and a dehydrating agent are brought into contact, methods in which the catalyst composition is placed under reduced pressure, methods in which the catalyst composition is heated, methods in which the catalyst composition is heated under reduced pressure, and the like. One of these may be performed alone, or a combination of two or more of these may be performed. Among these, a method in which the catalyst composition is heated under reduced pressure is preferable as the dehydration treatment or the devolatilization treatment.

As the dehydrating agent, a typical dehydrating agent can be used. Specific examples of the dehydrating agent include silica gel, calcium chloride, diphosphorus pentoxide, molecular sieve, sodium sulfate, magnesium sulfate and the like. In the case where the catalyst composition is placed under reduced pressure, the degree of pressure reduction is, for example, 300 torr (40 kPa) or less, preferably 100 torr (13.3 kPa) or less, and more preferably 0.01 torr (1.3 Pa) to 100 torr (13.3 kPa). In the case where the catalyst composition is heated, the temperature of the catalyst composition is, for example, not lower than the melting point of the dialcohol compound, preferably not lower than the melting point of the dialcohol compound but not higher than the temperature 80° C. higher than the melting point, more preferably not lower than the melting point of the dialcohol compound but not higher than the temperature 50° C. higher than the melting point, and for example, can be 50° C. to 120° C., and preferably 60° C. to 90° C. In the case where the catalyst composition is heated under reduced pressure, the degree of pressure reduction and the temperature are, for example, not lower than the melting point of the dialcohol compound at 300 torr (40 kPa) or less, and preferably a temperature that is not lower than the melting point of the dialcohol compound but not higher than the temperature 50° C. higher than the melting point at 0.01 torr (1.3 Pa) to 100 torr (13.3 kPa).

The treatment time of the dehydration treatment or the devolatilization treatment can be selected appropriately depending on treatment methods or the like. The treatment time is, for example, 10 minutes to 70 minutes, and preferably 30 minutes to 60 minutes.

The water content of the catalyst composition is not particularly limited and can be selected appropriately depending on the purpose and the like. The water content of the catalyst composition is, for example, 3 mass % or less, preferably 1 mass % or less, and more preferably 0.5 mass % or less. When the water content of the catalyst composition is not more than a predetermined amount, stability of the catalyst composition is further enhanced. Furthermore, it becomes easier to achieve a high molecular weight even faster.

As an apparatus to perform the step of producing the catalyst composition (hereinafter, also referred to as "a catalyst composition preparation tank"), for example, a catalyst composition preparation tank that is an agitation tank equipped with an agitating means and a heating means, can be used. The agitating means is not particularly limited and can be selected appropriately from typical agitation apparatuses. As the agitating means, for example, a typical stirring blade, such as an anchor blade or a paddle blade, can be used. Furthermore, the catalyst composition preparation tank is preferably provided with a pressure reducing means.

The material of the catalyst composition preparation tank is not particularly limited and may be selected appropriately from typically used materials such as metal materials and glass materials depending on the purpose and the like. The material of the surface that is in contact with the catalyst composition of the catalyst composition preparation tank is preferably a material having the iron content of 80 mass % or less, and more preferably at least one member selected from the group consisting of (a) metal materials having the iron content of 80 mass % or less and the Cr content of 18 mass % or more, or metal materials which are stainless steels such as SUS304, SUS316, SUS316L and SUS310S or clad materials and (b) glass materials, from the perspective of quality such as color of the obtained resin.

When the material of the catalyst composition preparation tank is a metal material, the iron content is preferably 80 mass % or less, and is more preferably stainless steel having the iron content of 80 mass % or less and the Cr content of 18 mass % or more. Specific examples of the stainless steel include austenitic stainless steel and the like, and more specific examples thereof include SUS304, SUS304L, SUS316, SUS316L, SUS309S, SUS310S, SUS317, SUS317L, and the like. At least one member selected from the group consisting of these is preferable.

Furthermore, when the material of the catalyst composition preparation tank is glass, glass with which the eluted amount of alkali metal is 15 ppb/cm$^2$ or less when the glass is immersed in pure water at 50° C. for 120 hours is preferable.

The number of the catalyst composition preparation tank(s) is not particularly limited, and a plurality of catalyst composition preparation tanks may be used as necessary. When a plurality of catalyst composition preparation tanks are used, the step of producing the catalyst composition is performed independently in each catalyst composition preparation tank, and each of the catalyst compositions prepared in each of the catalyst composition preparation tanks is preferably used in the second step sequentially. That is, aspects where charging of a catalyst composition prepared in one catalyst composition preparation tank into the second step and charging of another catalyst composition prepared in another catalyst composition preparation tank into the second step are sequentially performed are preferable.

On the catalyst composition preparation tank, at least one catalyst composition outlet with a valve from which the prepared catalyst composition is taken out may be arranged. The position at which the catalyst composition outlet is placed is not particularly limited and can be selected appropriately depending on the construction of the manufacturing apparatus. The catalyst composition outlet is preferably arranged at, for example, a position that is lower than the liquid level during steady operation.

When the catalyst composition outlet is provided on the catalyst composition preparation tank, a transfer tube is connected to the catalyst composition outlet, and the catalyst composition preparation tank may be connected to a prepolymer mixing tank, in which the catalyst composition and the prepolymer are mixed, through the transfer tube. The catalyst composition outlet and the transfer tube are connected, for example, through a flange.

Note that, when there are a plurality of catalyst composition preparation tanks, the transfer tube connected to each catalyst composition preparation tank may be each independently connected to the prepolymer mixing tank, or may be each connected to one transfer tube that connects to the prepolymer mixing tank via a switch valve.

The method of mixing the dialcohol compound and the catalyst in the first step is not particularly limited. For example, a predetermined amount of the catalyst may be fed and mixed in a catalyst composition preparation tank after a predetermined amount of the dialcohol compound was fed to the catalyst composition preparation tank, contrarily, a predetermined amount of the dialcohol compound may be fed and mixed in a catalyst composition preparation tank after a predetermined amount of the catalyst was fed to the catalyst composition preparation tank, the dialcohol compound and the catalyst may be fed and mixed in a catalyst composition preparation tank alternately, or the dialcohol compound and the catalyst may be simultaneously fed and mixed in a catalyst composition preparation tank.

When the dialcohol compound or the catalyst composition is fed to a catalyst composition preparation tank, a filtration device may be used.

When a plurality of catalyst composition preparation tanks is used, for example, after preparation of the catalyst composition is started in a first catalyst composition preparation tank, preparation of the catalyst composition in another catalyst composition preparation tank can be started before the amount of the catalyst composition prepared in the first catalyst composition preparation tank reaches ⅔ relative to the amount of the catalyst composition at the time of completion of the preparation. The high molecular weight aromatic polycarbonate can be produced more efficiently by allowing the catalyst compositions to be prepared concurrently by using a plurality of catalyst composition preparation tanks.

The method of feeding the dialcohol compound and the catalyst to the catalyst composition preparation tank is not particularly limited. For example, a constant amount of each of the dialcohol compound and the catalyst (preferably a catalyst solution or dispersion) is fed to the catalyst composition preparation tank from a hopper equipped with a pressure discharge tube and through a device that feeds the constant amount. A feeding tube may be arranged between the device that feeds the constant amount and the catalyst composition preparation tank. Furthermore, the hopper and the catalyst composition preparation tank may be connected by a pressure equalizing tube, and in this case, the inner diameter of the pressure discharge tube may be ⅙ to ½ relative to the inner diameter of the feeding tube, and the inner diameter of the pressure equalizing tube may be ⅕ to ½ relative to the inner diameter of the feeding tube. The amounts of the dialcohol compound and the catalyst retained in the hopper are not particularly limited and, for example, may be 30 vol % to 90 vol % of the effective volume of each hopper.

The content ratio of the dialcohol compound and the catalyst in the catalyst composition is not particularly limited and can be selected appropriately depending on the type of the catalyst and the like. The content ratio of the catalyst to the dialcohol compound (catalyst/dialcohol compound, mass %) is, for example, 0.0001 mass % to 0.1 mass %, preferably 0.0005 mass % to 0.01 mass %, more preferably 0.0005 mass % to 0.007 mass %, and particularly preferably 0.001 mass % to 0.005 mass %.

The catalyst composition may contain another component except the dialcohol compound and the catalyst. Examples of such another component include water, organic solvents, phenol compounds and the like.

The content of such another component except the dialcohol compound and the catalyst contained by the catalyst composition is preferably 3 mass % or less, more preferably 1 mass % or less, even more preferably 0.3 mass % or less, and particularly preferably 0.03 mass % or less, in the catalyst composition.

The content of water in the catalyst composition can be measured by, for example, the Karl Fischer method. For example, the content of organic solvents, phenol compounds and the like in the catalyst composition can be measured by, for example, gas chromatography.

The dialcohol compound contained by the catalyst composition means a compound having two alcoholic hydroxy groups each bonding to a non-aromatic carbon atom. The dialcohol compound may have a partial structure containing an aromatic ring in the molecular structure; however, a phenol compound having a hydroxy group bonded to an aromatic ring is not included by the dialcohol compound.

The dialcohol compound used in the manufacturing method of the present embodiment is represented by General Formula (1) below.

[Chemical Formula 3]

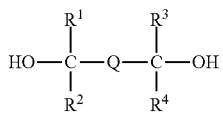

(1)

In General Formula (1), $R^1$ to $R^4$ each independently represent a hydrogen atom, a halogen atom, or a linear or branched alkyl group having 1 to 5 carbons. $R^1$ to $R^4$ are each independently preferably a hydrogen atom, a fluorine atom, a chlorine atom, or an alkyl group having 1 to 3 carbons, more preferably a hydrogen atom, a fluorine atom or a methyl group, and even more preferably a hydrogen atom, from the perspective of reaction efficiency of the high molecular weight achievement reaction.

Furthermore, as $R^1$ to $R^4$, at least one of $R^1$ and $R^2$ and at least one of $R^3$ and $R^4$ are preferably hydrogen atoms, and all of $R^1$ to $R^4$ are more preferably hydrogen atoms. That is, the dialcohol compound represented by General Formula (1) is preferably a secondary dialcohol compound or a primary dialcohol compound, and more preferably a primary dialcohol compound.

Q represents a single bond or a substituted or unsubstituted divalent group comprising at least one member selected from the group consisting of an aliphatic group, an aromatic group, an oxygen atom, a sulfur atom, a sulfone group, a sulfoxide group, a carbonyl group, a dialkylsilyl group and a diarylsilyl group.

Examples of the aliphatic group represented by Q include divalent groups derived from a linear or branched alkane having 1 to 20 carbons, divalent groups derived from a linear or branched alkene having 1 to 20 carbons, groups derived from a cycloalkane or cycloalkene having 3 to 30 carbons, and the like. Note that the divalent group derived from alkane or the like means a group formed by removing two hydrogen atoms from an alkane or the like, and the positions from which the hydrogen atoms are removed are not particularly limited. The cycloalkane and the cycloalkene may be a crosslinked ring such as bicycloalkane and tricycloalkane, a condensed ring of another aliphatic ring, aromatic ring and the like, or an aggregate of polycyclic rings. Furthermore, in the case where the aliphatic group contains a ring structure, the cycloalkane and the cycloalkene may be aliphatic hetero ring group in which at least one carbon atom constituting the ring is substituted with a heteroatom such as an oxygen atom, a nitrogen atom or a sulfur atom.

Specific examples of the aliphatic group containing a ring structure include cyclohexanediyl, decalindiyl, octahydroindenediyl, adamantanediyl, oxacyclohexanediyl, dioxacyclohexanediyl and the like.

Examples of the aromatic group represented by Q include divalent aromatic groups having 6 to 40 carbons. The aromatic group may be a hetero aromatic group in which at least one carbon atom is substituted with a heteroatom such as an oxygen atom, a nitrogen atom and a sulfur atom.

Specific examples of the aromatic group include phenylene, naphthalenediyl, benzofurandiyl and the like.

Q may be a divalent group that is formed by combining at least two members selected from the group consisting of an aliphatic group, an aromatic group, an oxygen atom, a sulfur atom, a sulfone group, a sulfoxide group, a carbonyl group, a dialkylsilyl group and a diarylsilyl group. Examples of the group formed by such a combination include open-chain divalent groups, such as alkyleneoxyalkyl groups, alkylenesulfonylalkyl groups, a biphenylene group, polyarylene groups, polycarbonate groups (e.g. including alkylene groups, cycloalkylene groups, alkylene cycloalkylene alkylene groups, alkylene arylene alkylene groups and the like as a partial structure) and alkyleneoxy aryleneoxy alkylene groups, and divalent groups having a cyclic structure, such as oxacycloalkylene groups, dioxacycloalkylene groups, dioxacycloalkylidene groups and fluorenylidene groups.

Q may have a substituent group. Examples of the substituent group include alkyl groups having 1 to 12 carbons, alkoxy groups having 1 to 10 carbons, aryl groups having 6 to 10 carbons, aryloxy groups having 6 to 10 carbons, halogen atoms, such as a fluorine atom and a chlorine atom, and the like. In the case where Q has substituent group(s), the number of the substituent group(s) is not particularly limited as long as such substitution is possible.

The dialcohol compound represented by General Formula (1) include 2-hydroxyethoxy group-containing compounds, hydroxyalkyl group-containing compounds, carbonate diol compounds and the like.

The dialcohol compound represented by General Formula (1) is preferably represented by General Formula (1a) below.

[Chemical Formula 4]

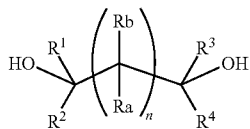

(1a)

In General Formula (1a), Ra and Rb may represent each independently a hydrogen atom, a halogen atom, a linear or branched alkyl group that may have an oxygen atom or a halogen atom and that has 1 to 30 carbons, a cycloalkyl group that may have an oxygen atom or a halogen atom and that has 3 to 30 carbons, an aryl group that may have an oxygen atom or a halogen atom and that has 6 to 30 carbons, or an alkoxy group that may have an oxygen atom or a halogen atom and that has 1 to 15 carbons, or Ra and Rb may be bonded to each other to form a ring. As the halogen atom, a fluorine atom is preferable.

$R^1$ to $R^4$ each independently represent a hydrogen atom, a halogen atom, or a linear or branched alkyl group having 1 to 5 carbons. As the halogen atom, a fluorine atom is preferable.

n represents an integer of 0 to 30, preferably 1 to 6, more preferably 1 to 3, and particularly preferably 1.

In General Formula (1a), Ra and Rb preferably represent each independently a hydrogen atom, a halogen atom, a linear or branched alkyl group having 1 to 8 carbons, a cycloalkyl group having 3 to 8 carbons, an aryl group having 6 to 10 carbons, or an alkoxy group having 1 to 8 carbons, or Ra and Rb may be bonded to each other to form an alicyclic ring having 3 to 8 carbons. As the halogen atom, a fluorine atom is preferable.

$R^1$ to $R^4$ preferably each independently represent a hydrogen atom, a fluorine atom or a methyl group.

n preferably represents an integer of 1 to 6.

In General Formula (1a), Ra and Rb more preferably represent each independently a hydrogen atom, or a linear or branched alkyl group having 1 to 5 carbons, and even more preferably a linear or branched alkyl group having 1 to 4 carbons. Preferable specific examples thereof include a methyl group, an ethyl group, a propyl group, a n-butyl group, an isobutyl group, an isopentyl group and the like. More preferable specific examples thereof include a methyl group, an ethyl group, a propyl group, a n-butyl group and an isobutyl group. $R^1$ to $R^4$ are more preferably each a hydrogen atom. n more preferably represents an integer of 1 to 3.

The dialcohol compound represented by General Formula (1) is more preferably a compound represented by General Formula (1b) below. In General Formula (1b), Ra and Rb are respectively the same as Ra and Rb in General Formula (1a).

[Chemical Formula 5]

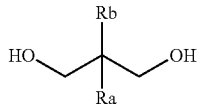

(1b)

In General Formula (1b), Ra and Rb are, each independently, more preferably a hydrogen atom, or a linear or branched alkyl group having 1 to 5 carbons, even more preferably a linear or branched alkyl group having 1 to 4 carbons, and yet even more preferably a linear or branched alkyl group having 2 to 4 carbons. Preferable specific examples thereof include a methyl group, an ethyl group, a propyl group, a n-butyl group, an isobutyl group, an isopentyl group and the like. More preferable examples thereof include an ethyl group, a propyl group, a n-butyl group, and an isobutyl group.

More specific examples of the dialcohol compound include dialcohols having a cyclic structure, such as 1,4-cyclohexanediol, 1,4-cyclohexanedimethanol, 1,6-cyclohexanedimethanol, tricyclo[5.2.1.0$^{2,6}$]decanedimethanol, decalin-2,6-dimethanol, pentacyclopentadecanedimethanol, isosorbide, isomannide and 1,3-adamantanedimethanol; dialcohols having an aromatic ring, such as p-xylylene glycol, m-xylylene glycol, naphthalenedimethanol, biphenyldimethanol, 1,4-bis(2-hydroxyethoxy)phenyl, 4,4'-bis(2-hydroxyethoxy)biphenyl, 2,2'-bis[(2-hydroxyethoxy)phenyl]propane, 9,9-bis[4-(2-hydroxyethoxy)phenyl]fluorene (BPEF), 9,9-bis(hydroxymethyl)fluorene, 9,9-bis(hydroxyethyl)fluorene, fluorene glycol and fluorene diethanol; aliphatic polyester diols, such as polycaprolactone diol, poly (1,4-butanediol adipate)diol and poly(1,4-butanediol succinate)diol; branched aliphatic dialcohols, such as 2-butyl-2-ethylpropane-1,3-diol(2-butyl-2-ethyl-1,3-propane glycol; BEPG), 2,2-diethylpropane-1,3-diol, 2,2-diisobutylpropane-1,3-diol, 2,2-diisoamylpropane-1,3-diol, 2-ethyl-2-methylpropane-1,3-diol, 2-methyl-2-propylpropane-1,3-diol, 2-methylpropane-1,3-diol, propane-1,3-diol and propane-1,2-diol; carbonate diol-based compounds, such as bis(3-hydroxy-2,2-dimethylpropyl)carbonate; and the like. At least one member selected from the group consisting of these is preferable.

The dialcohol compound is more preferably selected from the group consisting of pentacyclopentadecanedimethanol, 1,4-cyclohexanedimethanol, 1,3-adamantanedimethanol, decalin-2,6-dimethanol, tricyclo[5.2.1.0$^{2,6}$]decanedimethanol, 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, propane-1,3-diol, 2,2-diisoamylpropane-1,3-diol and 2-methylpropane-1,3-diol.

The dialcohol compound is even more preferably at least one member selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, propane-1,3-diol, 2,2-diisoamylpropane-1,3-diol and 2-methylpropane-1,3-diol.

One member of the dialcohol compounds may be used, or a combination of two or more members of the dialcohol compounds may be used. Note that the dialcohol compound that is actually used can be appropriately selected depending on the employed reaction conditions and the like because a preferable member of compound may differ depending on the reaction conditions and the like.

The upper limit of the boiling point of the dialcohol compound is not particularly limited. For example, the upper limit of the boiling point is 500° C. or lower. Note that, according to the method of the present embodiment, even when the dialcohol compound is a dialcohol compound having a relatively low boiling point, the dialcohol compound can efficiently contribute to the linking and high molecular weight achievement reaction. Therefore, an even more preferable dialcohol compound is a dialcohol compound having a relatively low boiling point which is the boiling point of 350° C. or lower.

The lower limit of the boiling point of the dialcohol compound is not particularly limited. Taking into consideration distilling off an aromatic monohydroxy compound, which is produced as a byproduct along with the reaction between the aromatic polycarbonate prepolymer and the dialcohol compound, the dialcohol compound is preferably a dialcohol compound having a higher boiling point than the boiling point of the aromatic monohydroxy compound. Furthermore, the lower limit of the boiling point of the dialcohol compound is preferably selected by taking into consideration the fact that the reaction needs to proceed securely without volatilization at a constant temperature and pressure.

The dialcohol compound preferably has a high purity and preferably has a purity of 99 mass % or more. Examples of the impurities contained by the dialcohol compound include 2-ethyl-1-hexanol and the like, for example, in the case where the dialcohol compound is 2-butyl-2-ethylpropane-1,3-diol.

Furthermore, the amount of metal contained as the impurities by the dialcohol compound is preferably small. Examples of the metal contained as the impurities include iron and the like. The amount of metal contained by the dialcohol compound is, for example, 5 ppm or less, and preferably 1 ppm or less.

The used amount of the dialcohol compound is preferably 0.01 mol to 1.0 mol, more preferably 0.1 mol to 1.0 mol, even more preferably 0.1 mol to 0.5 mol, and particularly preferably 0.2 mol to 0.4 mol, per 1 mol total of all the terminal groups in the aromatic polycarbonate prepolymer.

When the used amount of the dialcohol compound is not more than the upper limit value described above, occurrence of insertion reactions by which the dialcohol compound is inserted into a main chain of the aromatic polycarbonate resin as a copolymer component is suppressed, and effect on physical properties due to increase of the proportion of the copolymer tends to be suppressed. On the other hand, when the proportion of the copolymer is increased exceeding the upper limit value, it is not preferable in terms of the effect of making the aromatic polycarbonate resin have a high molecular weight although enhancement in the physical properties obtained by using the dialcohol compound becomes easier. Furthermore, when the used amount of the dialcohol compound is not less than the lower limit value described above, the effect of making the molecular weight high becomes even greater, and it is thus preferable.

The catalyst contained by the catalyst composition is not particularly limited as long as the catalyst can promote the linking and high molecular weight achievement reaction between the aromatic polycarbonate prepolymer and the dialcohol compound. For example, as the catalyst, a trans-esterification catalyst that is typically used as a catalyst for polycarbonate production, such as a basic compound catalyst, can be used.

Examples of the basic compound catalyst include alkali metal compounds and/or alkaline earth metal compounds, nitrogen-containing compounds and the like.

Examples of the alkali metal compound and/or alkaline earth metal compound include organic acid salts, inorganic salts, oxides, hydroxides, hydrides, alkoxides and phenoxides of alkali metals and alkaline earth metals. Examples of the nitrogen-containing compound include quaternary ammonium hydroxide and salts thereof, amines and the like.

One member of these compounds may be used, or a combination of two or more members of these compounds may be used.

Specific examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, phenylated sodium borate, sodium tetraphenylborate, sodium benzoate, potassium benzoate, cesium benzoate, lithium benzoate, disodium hydrogenphosphate, dipotassium hydrogenphosphate, dilithium hydrogenphosphate, disodium phenyl phosphate, disodium salt, dipotassium salt, dicesium salt and dilithium salt of bisphenol A, sodium salt, potassium salt, cesium salt and lithium salt of phenol, and the like.

Specific examples of the alkaline earth metal compound include magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate and the like.

Specific examples of the nitrogen-containing compound include quaternary ammonium hydroxides having an alkyl group and/or an aryl group, such as tetramethylammonium hydroxide, tetraethylammonium hydroxide, tetrapropylammonium hydroxide, tetrabutylammonium hydroxide and trimethylbenzylammonium hydroxide; tertiary amines, such as triethylamine, dimethylbenzylamine and triphenylamine; secondary amines, such as diethylamine and dibutylamine; primary amines, such as propylamine and butylamine; imidazoles, such as 2-methylimidazole, 2-phenylimidazole and benzimidazole; bases or basic salts, such as ammonia, tetramethylammonium borohydride, tetrabutylammonium borohydride, tetrabutylammonium tetraphenylborate and tetraphenylammonium tetraphenylborate; and the like.

As other catalyst except those described above, a metal salt of zinc, tin, zirconium, lead or the like is preferably used, and one member of these may be used, or a combination of two or more members of these may be used.

Specific examples of such other catalyst include zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, lead(IV) acetate and the like.

In the manufacturing method of the present embodiment, use of at least one member selected from the group consisting of cesium carbonate ($Cs_2CO_3$), sodium hydrogen carbonate ($NaHCO_3$), sodium tetraphenylborate, disodium phenyl phosphate and potassium carbonate as the alkali metal compound and/or the alkaline earth metal compound is preferable. Among these, at least one of cesium carbonate and potassium carbonate is more preferable. One member of these catalysts may be used, or a combination of two or more members of these catalysts may be used.

The used proportion of these catalysts is, for example, $1 \times 10^{-6}$ mol or less, preferably $1 \times 10^{-8}$ mol to $1 \times 10^{-6}$ mol, and even more preferably $1 \times 10^{-7}$ mol to $1 \times 10^{-6}$ mol, per 1 mol total of the aromatic dihydroxy compounds constituting the aromatic polycarbonate prepolymer.

Furthermore, as the nitrogen-containing compound catalyst, tetramethylammonium hydroxide is preferably used. One member of the nitrogen-containing compound catalysts may be used, or a combination of the nitrogen-containing compound catalyst with the alkali metal and/or alkaline earth metal or the like described above may be used. The used proportion of these nitrogen-containing compound catalysts is $1\times10^{-3}$ mol or less, preferably $1\times10^{-7}$ mol to $1\times10^{-3}$ mol, and even more preferably $1\times10^{-6}$ mol to $1\times10^{-4}$ mol, per 1 mol total of the aromatic dihydroxy compounds constituting the aromatic polycarbonate prepolymer.

The catalyst composition produced in the first step preferably contains at least one member of dialcohol compound and at least one member of catalyst selected from the group consisting of alkali metal compounds and alkaline earth metal compounds, and more preferably contains a dialcohol compound represented by General Formula (1b) and at least one member of catalyst selected from the group consisting of alkali metal compounds.

When the catalyst composition contains a dialcohol compound and at least one member of catalyst selected from the group consisting of alkali metal compounds and alkaline earth metal compounds, the content of the catalyst is preferably 0.0001 mass % to 0.01 mass %, more preferably 0.0005 mass % to 0.007 mass %, and even more preferably 0.001 mass % to 0.005 mass %.

Second Step

In the second step, a prepolymer mixture is obtained by mixing the catalyst composition in a liquid form produced in the first step and an aromatic polycarbonate prepolymer (hereinafter, also simply referred to as "a prepolymer" or "PP") within a period of 10 hours from the time of production of the catalyst composition.

By mixing the catalyst composition containing the dialcohol compound and the catalyst with a prepolymer within 10 hours from the time of production of the catalyst composition, to obtain a prepolymer mixture, a high molecular weight aromatic polycarbonate resin, which has excellent quality such as color and in which the high molecular weight has been sufficiently achieved, can be efficiently produced. Furthermore, generation of heterologous structures in the high molecular weight achievement reaction can be effectively suppressed. In particular, even when at least one of the alkali metal and alkaline earth metal compounds is used as the catalyst, the generation of heterologous structures can be efficiently suppressed while excellent catalytic activity thereof is fully utilized.

In the case where the catalyst composition produced in the first step is not immediately mixed with the prepolymer in the second step, the catalyst composition is retained in the liquid form. The catalyst composition may be, for example, retained in a catalyst composition preparation tank, in another storage tank that is not the catalyst composition preparation tank, or in a transfer tube described below.

Using a plurality of catalyst composition preparation tanks, in the case where the catalyst composition is prepared in each of catalyst composition preparation tanks, for example, by retaining another catalyst composition prepared in another catalyst composition preparation tank in a liquid form while a prepolymer mixture is prepared by using a first catalyst composition prepared in a first catalyst composition preparation tank, it becomes easy to perform preparation of the prepolymer mixture continuously, and thus production efficiency can be further enhanced.

The liquid form of the catalyst composition can be maintained by heating the catalyst composition, for example. The heating temperature is not particularly limited as long as the liquid form can be maintained and, for example, is preferably not lower than a temperature 5° C. higher than the melting point but not higher than a temperature 250° C. higher than the melting point of the dialcohol compound, more preferably not lower than a temperature 5° C. higher than the melting point but not higher than a temperature 80° C. higher than the melting point of the dialcohol compound, and even more preferably not lower than a temperature 5° C. higher than the melting point but not higher than a temperature 50° C. higher than the melting point of the dialcohol compound.

The viscosity of the catalyst composition retained in a liquid form is not particularly limited. The viscosity of the catalyst composition retained in a liquid form is, for example, preferably from 0.1 P to 10,000 P (poise; 0.01 Pa·s to 1,000 Pa·s), and more preferably from 1 P to 100 P (0.1 Pa·s to 10 Pa·s).

The pressure, at which the catalyst composition is retained, is not particularly limited, and may be a normal pressure, a pressure that is higher than the normal pressure, or a pressure that is lower than the normal pressure. The catalyst composition is preferably retained under a substantially constant pressure, and more preferably retained under pressures in which the range of variation of the pressure is within ±10%. Retaining of the catalyst composition under a substantially constant pressure makes it easy to stably maintain a supplied amount of the catalyst composition during mixing with the prepolymer, for example. Because of this, variation in quality of the obtained prepolymer mixture can be efficiently suppressed.

The atmosphere in which the catalyst composition is retained is not particularly limited and can be selected appropriately from typically used atmospheres depending on the purpose and the like. The atmosphere in which the catalyst composition is retained may be any of an air atmosphere and an inert gas atmosphere. From the perspective of achieving superior quality such as color and a predetermined molecular weight, the oxygen concentration in the atmosphere in which the catalyst composition is retained is preferably 10 vol % or less, and more preferably 5 vol % or less.

The catalyst composition in a liquid form is mixed with the prepolymer within 10 hours and preferably within 9 hours, from the time of production of the catalyst composition. The mixing of the catalyst composition in a liquid form and the prepolymer can be performed in, for example, a prepolymer mixing tank. Note that the starting point of the time period until the mixing of the catalyst composition and the prepolymer is the time when a predetermined amount of the catalyst composition is produced, and in the case where the step of producing the catalyst composition includes dehydration treatment or devolatilization treatment, the starting point is the time when such treatment is completed. Furthermore, the terminating point is the time at which the catalyst composition and the prepolymer are brought into contact for the first time. Note that, when the catalyst composition is transferred through a transfer tube, the time required for the transfer is included by the time period until the catalyst composition and the prepolymer are mixed.

When the catalyst composition is transferred through the transfer tube, the time required for the transfer of the catalyst composition is not particularly limited and, for example, can be 10 hours or less. From the perspectives of achieving superior quality such as color and achieving a desired molecular weight in a shorter period of time, the transfer time is preferably 3 hours or less, and more preferably 1 hour or less. The transfer time is calculated by using the time at which the catalyst composition is introduced into the transfer tube as the starting point, and the time at which the catalyst composition is taken out from the transfer tube to be brought into contact with the prepolymer as the terminating point.

The material of the transfer tube is not particularly limited and may be selected appropriately from typically used materials depending on the purpose and the like. From the perspective of color of the obtained resin, the material of the surface that is in contact with the catalyst composition of the transfer tube is preferably stainless steel having the iron content of 80 mass % or less and the Cr content of 18 mass % or more. Specific examples thereof include austenitic stainless steel and the like, and more specific examples thereof include SUS304, SUS304L, SUS316, SUS316L, SUS309S, SUS310S, SUS317, SUS317L and the like. At least one member selected from the group consisting of these is preferable.

The cross-sectional shape of the transfer tube is not particularly limited and, for example, may be substantially circle. The length and the inner diameter of the transfer tube are not particularly limited and can be selected appropriately depending on the purpose and the like. The length of the transfer tube may be, for example, 50 m or less, and is preferably 30 m or less, and more preferably 20 m or less. The lower limit of the length is not particularly limited and, for example, the length is 5 m or more. Furthermore, the inner diameter of the transfer tube is, for example, 0.5 mm or more, and preferably 1 mm or more. The upper limit of the inner diameter is not particularly limited and, for example, the inner diameter is 100 mm or less, and preferably 10 mm or less. Note that, when the cross section of the transfer tube is not circular, the inner diameter of the transfer tube means the equivalent diameter and is a diameter of the case where the cross section of the transfer tube is converted into a circle having the same area.

The transfer tube may have a heating means by which the catalyst composition in an inner part can be heated. The heating means is not particularly limited and can be selected appropriately from typically used heating means. For example, the transfer tube can be a duplex tube and can be a heating means by circulating a heating medium between the inner tube and the outer tube.

The transfer tube may have a filtration means. The filtration means is not particularly limited and can be selected appropriately from typically used filtration means depending on the purpose and the like. The catalyst composition is preferably mixed with the prepolymer after the catalyst composition passed through the filtration means. In the case where a liquid transfer pump is used to transfer the catalyst composition, a strainer may be arranged on at least one of an earlier stage and a later stage of the liquid transfer pump, and the strainer is preferably arranged on a later stage of the liquid transfer pump and before introduction into a prepolymer mixing tank.

The transfer tube is, for example, connected to the prepolymer mixing tank in which the catalyst composition and the prepolymer are mixed. The structure of a connection portion of the transfer tube and the prepolymer mixing tank is not particularly limited and, for example, connection is achieved through a flange. The connection portion of the transfer tube and the prepolymer mixing tank preferably has a check valve, and the catalyst composition is more preferably introduced into the prepolymer mixing tank from the transfer tube through the check valve by backpressure.

In the second step, the method of mixing the catalyst composition and the aromatic polycarbonate prepolymer to prepare the prepolymer mixture is not particularly limited and can be appropriately selected from conventionally known methods of preparing resin mixtures. Examples of the method of preparing the prepolymer mixture include methods that use an in-line mixer.

The in-line mixer is a mixer that enables direct mixing and homogenization of two or more members of fluids (gas and/or liquid) in a piping line. Examples of such an in-line mixer include static mixers (static type mixers), dynamic mixers, planetary mixers, plow mixers, kneaders, extruders, high-speed twin-screw kneaders, continuous blenders and the like.

Examples of the static mixer include the Sulzer mixers available from Sulzer (SMX type, SMB-H type and the like), static mixers available from Tokyo Nisshin Jabara Co., Ltd. (WB-32A and the like), static mixers available from Noritake Co., Limited, and the like.

Examples of the kneader include the KRC kneaders and the KRC reactors available from Kurimoto, Ltd., the NES•KO kneaders available from Chemical Engineering K.K., and the like.

Examples of the high-speed twin-screw kneader include FCM type kneaders available from Farrell in the US, the LCM type kneaders available from Kobe Steel, Ltd., and the CIM and CPM type kneaders available from The Japan Steel Works, Ltd.

Examples of the extruder include the ZSK type twin-screw extruders available from Werner & Pfleiderer in Germany and the like.

Examples of the continuous blender include the NES•KO blenders available from Chemical Engineering K.K., and the like.

The mixing ratio of the catalyst composition and the prepolymer can be selected appropriately depending on the compositions of the catalyst composition and the prepolymer, and the like. For example, mixing is possible so that the amount of the dialcohol compound is 0.01 mol to 1.0 mol, more preferably 0.1 mol to 1.0 mol, even more preferably 0.1 mol to 0.5 mol, and particularly preferably 0.2 mol to 0.4 mol, per 1 mol total of all the terminal groups in the prepolymer.

As the mixing ratio of the catalyst composition and the prepolymer in the second step, fluctuation of the set mixing ratio is preferably within a predetermined range. For example, degree of the fluctuation of the set mixing ratio may be ±10 mass % or less, and is preferably ±5 mass % or less. When the degree of the fluctuation of the set mixing ratio is within the predetermined range, a high molecular weight aromatic polycarbonate resin with even higher quality can be produced.

The pressure during the mixing of the prepolymer and the catalyst composition in the second step is not particularly limited, and the mixing may be performed under reduced pressure conditions or pressurized conditions. For example, the mixing is performed under a pressure more than 200 torr (26.7 kPa), preferably 500 torr (66.7 kPa) or more, more preferably 700 torr (93.3 kPa) or more, and even more preferably at a normal pressure (760 torr, 0.10 MPa). When the mixing is performed at a pressure that is 200 torr (26.7 kPa) or more, volatilization is suppressed even in the case of the dialcohol compound having a relatively low boiling point, and reactivity in the high molecular weight achievement reaction tends to be further enhanced.

The pressure during the mixing of the prepolymer and the catalyst composition is also preferably a pressure that is not lower than the vapor pressure of the dialcohol compound at the temperature during the mixing, more preferably a pressure that is at least 1 Pa higher, and more preferably a pressure that is at least 3 Pa higher, than the vapor pressure of the dialcohol compound at the temperature during the mixing.

The prepolymer used in the manufacturing method of the present embodiment is preferably a prepolymer having a high proportion of terminal-capping groups and having a relatively low terminal hydroxy group concentration (preferably the terminal hydroxy group concentration of 1,500 ppm or less). When the dialcohol compound is added to such an aromatic polycarbonate prepolymer, the reaction between the terminal of the aromatic polycarbonate prepolymer and the dialcohol compound significantly quickly proceeds.

Details of the terminal-capping group and the terminal hydroxy group concentration of the prepolymer are described below.

When the terminal hydroxy group concentration is increased excessively due to a cleavage (fragmentation) reaction, the molecular weight of the prepolymer in the prepolymer mixture fed to the third step (high molecular weight achievement step) decreases excessively, and thus the molecular weight may not be sufficiently enhanced (high molecular weight body may not be obtained). Alternatively, to obtain a high molecular weight aromatic polycarbonate resin that achieves a sufficiently high molecular weight, the reaction time (retention time) of the third step needs to be long. If the reaction time (retention time) of the third step is longer, quality of the obtained high molecular weight aromatic polycarbonate resin may be deteriorated, such as a higher N value (structural viscosity index), decreased fluidity, coloration, and increased amount of heterologous structures.

Therefore, in the manufacturing method for a high molecular weight aromatic polycarbonate resin, after the prepolymer and the catalyst composition are mixed under a pressure that is more than 200 torr (26.7 kPa) to obtain a prepolymer mixture, the prepolymer mixture is preferably fed to the linking and high molecular weight achievement reaction under reduced pressure conditions in the third step before the terminal hydroxy group concentration of the prepolymer in the prepolymer mixture reaches 2,000 ppm.

The terminal hydroxy group concentration of the prepolymer in the prepolymer mixture when the prepolymer mixture is fed to the linking and high molecular weight achievement reactor is preferably less than 1,800 ppm, and more preferably less than 1,600 ppm.

From a more idealistic view point, the mixing time, mixing temperature and other mixing conditions in the second step are preferably set so that only one end of the dialcohol compound reacts with the prepolymer. That is, the prepolymer mixture obtained in the second step contains the prepolymer, the dialcohol compound, the reaction product obtained as a result of the reaction between the dialcohol compound and the prepolymer (more preferably the reaction product obtained as a result of the reaction between only one end of the dialcohol compound and the prepolymer), and the added catalyst.

Note that, in the prepolymer mixture, cyclic carbonates derived from the dialcohol compound and aromatic monohydroxy compounds such as phenol may be contained as reaction byproducts, in addition to the components described above. Furthermore, unreacted raw material monomers may also be contained.

The mixing time in the second step is not particularly limited as long as the time does not allow the terminal hydroxy group concentration of the prepolymer to reach 2,000 ppm and can be appropriately set depending on other mixing conditions (mixing temperature, type of mixer and the like). The mixing time is preferably 7 minutes or less, more preferably 5 minutes or less, and particularly preferably 3 minutes or less. That is, in the second step, it is preferable to feed the obtained prepolymer mixture into a polymerization vessel (also referred to as "a linking and high molecular weight achievement reactor") in the third step within 7 minutes, preferably within 5 minutes, and particularly preferably within 3 minutes, after addition of the catalyst composition containing the dialcohol compound to the prepolymer, thereby subjecting the prepolymer mixture to the linking and high molecular weight achievement reaction under reduced pressure conditions.

By making the mixing time shorter in the second step, progress of the cleavage (fragmentation) reaction of the prepolymer is suppressed, the linking and high molecular weight achievement reaction tends to proceed more efficiently in the third step, and quality of the obtained high molecular weight aromatic polycarbonate resin tends to be further enhanced.

The mixing temperature in the second step is not particularly limited as long as it is possible to mix the prepolymer and the catalyst composition. The mixing temperature in the second step is preferably 220° C. to 300° C., and more preferably 260° C. to 300° C.

Furthermore, in the case where the catalyst composition is transferred to the prepolymer mixing tank through the transfer tube, the mixing temperature in the prepolymer mixing tank is preferably a temperature that is higher than the temperature in the transfer tube, and more preferably a temperature that is 50° C. to 130° C. higher than the temperature in the transfer tube.

Furthermore, the weight average molecular weight of the prepolymer in the prepolymer mixture obtained in the second step is not particularly limited but is preferably 10,000 to 40,000, more preferably 12,000 to 35,000 (measured by GPC in terms of polystyrene).

The prepolymer used in the second step may be a prepolymer obtained in the step of preparing an aromatic polycarbonate prepolymer or may be a commercially available product or the like. The manufacturing method for a high molecular weight aromatic polycarbonate resin further preferably includes a step of preparing the aromatic polycarbonate prepolymer (hereinafter, also referred to as "a fourth step") in addition to the first to third steps.

The step of preparing the aromatic polycarbonate prepolymer preferably includes a step of obtaining an aromatic polycarbonate prepolymer by subjecting an aromatic dihydroxy compound and a diester carbonate to polycondensation reaction in the presence of a catalyst.

Examples of the aromatic dihydroxy compound which is a main raw material in the step of preparing the aromatic polycarbonate prepolymer include compounds represented by General Formula (3) below.

[Chemical Formula 6]

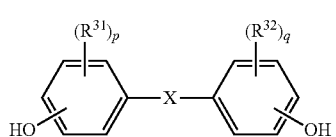

(3)

In General Formula (3), two phenylene groups may be, each independently, a p-phenylene group, a m-phenylene group, or an o-phenylene group, and both of the two phenylene groups are preferably p-phenylene groups.

In General Formula (3), $R^{31}$ and $R^{32}$ each independently represent a halogen atom, a nitro group, an amino group, an alkyl group having 1 to 20 carbons, an alkoxy group having 1 to 20 carbons, a cycloalkyl group having 6 to 20 carbons, an aryl group having 6 to 20 carbons, a cycloalkoxy group having 6 to 20 carbons, an aryloxy group having 6 to 20 carbons, or an aralkyl group having 7 to 20 carbons.

Specific preferable examples of $R^{31}$ and $R^{32}$ include a fluorine, an amino group, a methoxy group, a methyl group, a cyclohexyl group, a phenyl group and the like.

p and q are each an integer of 0 to 4, and preferably an integer of 0 to 2. X represents a single bond or a divalent group selected from linking groups (3a) described below. In the linking groups (3a), $R^{33}$ and $R^{34}$ each independently represent a hydrogen atom, an alkyl group having 1 to 10 carbons (preferably 1 to 6) or an aryl group having 6 to 10 carbons, or represent an aliphatic ring formed by bonding $R^{33}$ and $R^{34}$.

[Chemical Formula 7]

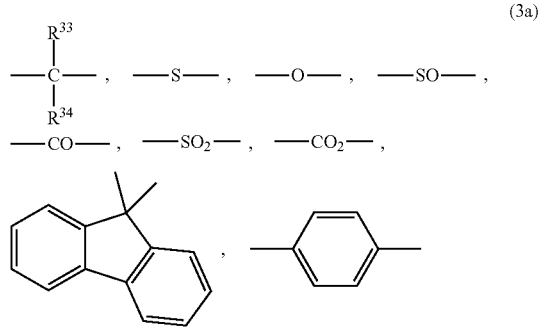

(3a)

Specific examples of such an aromatic dihydroxy compound include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(4-hydroxy-3-isopropylphenyl)propane, 2,2-bis(4-hydroxyphenyl)butane, 2,2-bis(4-hydroxyphenyl)octane, 2,2-bis(3-tert-butyl-4-hydroxyphenyl)propane, 2,2-bis(3-bromo-4-hydroxyphenyl)propane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3-cyclohexyl-4-hydroxyphenyl)propane, 1,1-bis(3-cyclohexyl-4-hydroxyphenyl)cyclohexane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 1,1-bis(4-hydroxyphenyl)-3,3,5-trimethylcyclohexane, 4,4'-dihydroxydiphenylether, 4,4'-dihydroxybiphenyl, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxy-3,3'-dimethylphenylether, 4,4'-dihydroxyphenylsulfide, 4,4'-dihydroxy-3,3'-dimethyldiphenylsulfide, 4,4'-dihydroxydiphenylsulfoxide, 4,4'-dihydroxy-3,3'-dimethyldiphenylsulfoxide, 4,4'-dihydroxydiphenylsulfone, 4,4'-dihydroxy-3,3'-dimethyldiphenylsulfone, 2,2'-diphenyl-4,4'-dihydroxydiphenylsulfonyl, 2,2'-dimethyl-4,4'-dihydroxydiphenylsulfonyl, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.0$^{2,5}$]decane, 4,4'-(1,3-adamantanediyl)diphenol, 1,3-bis(4-hydroxyphenyl)-5,7-dimethyladamantane and the like.

Among these, 2,2-bis(4-hydroxyphenyl)propane (hereinafter, also referred to as "bisphenol A" or "BPA") is more preferable because of its stability, availability of 2,2-bis(4-hydroxyphenyl)propane having only a small amount of impurities, and the like. A plurality of the aromatic dihydroxy compounds may be combined as necessary.

In the step of preparing the aromatic polycarbonate prepolymer, as necessary, an aromatic polycarbonate prepolymer containing polyester carbonate may be prepared by using a dicarboxylic acid compound, such as terephthalic acid, isophthalic acid, naphthalene dicarboxylic acid and 1,4-cyclohexane dicarboxylic acid, together with the aromatic dihydroxy compound described above.

Furthermore, in the step of preparing the aromatic polycarbonate prepolymer, a polyfunctional compound having 3 or more functional groups, and preferably 3 to 6 functional groups, per one molecule can be used together. As such a polyfunctional compound, a compound having a phenolic hydroxy group, a carboxy group, or the like is preferably used, and 1,1,1-tris(4-hydroxyphenyl)ethane is particularly preferably used.

Examples of the diester carbonate in the step of preparing the aromatic polycarbonate prepolymer include compounds represented by General Formula (4) below.

[Chemical Formula 8]

(4)

Note that A's in General Formula (4) represent each independently a substituted or unsubstituted, linear, branched or cyclic monovalent hydrocarbon group having 1 to 10 carbons. The two A moieties may be the same or different. In particular, A is preferably a substituted or unsubstituted, aromatic hydrocarbon group.

Specific examples of the diester carbonate include aromatic diester carbonates, such as diphenyl carbonate, ditolyl carbonate, bis(2-chlorophenyl)carbonate, m-cresyl carbonate, dinaphthyl carbonate and bis(4-phenylphenyl)carbonate. In addition, dimethyl carbonate, diethyl carbonate, dibutyl carbonate, dicyclohexyl carbonate or the like can be also used as desired. Among these, diphenyl carbonate is preferable from the perspectives of reactivity, stability to coloration of the obtained resin, and cost.

In the step of preparing the aromatic polycarbonate prepolymer, use of an excessive amount of the diester carbonate relative to the aromatic dihydroxy compound is preferable in order to introduce the terminal-capping group to the aromatic polycarbonate prepolymer. More preferably, the charged ratio of the diester carbonate to the aromatic dihydroxy compound is that diester carbonate/aromatic dihydroxy compound=1.01 to 1.30 (molar ratio). That is, the diester carbonate is preferably used in the proportion of 1.01 mol to 1.30 mol, more preferably 1.02 mol to 1.20 mol, and particularly preferably 1.03 mol to 1.15 mol, per 1 mol total of the aromatic dihydroxy compounds.

The polycondensation reaction of the aromatic dihydroxy compound and the diester carbonate in the step of preparing the aromatic polycarbonate prepolymer is performed in the presence of a catalyst. As the catalyst, a transesterification catalyst that is typically used as a catalyst for polycarbonate production, such as a basic compound catalyst, can be used similarly to the catalysts of the first step. Hereinafter, a catalyst in the first step is also referred to as "a first catalyst", and a catalyst in the step of preparing the aromatic polycarbonate prepolymer is also referred to as "a second catalyst".

The second catalyst is preferably at least one member selected from the group consisting of alkali metal compounds and alkaline earth metal compounds, more preferably at least one member selected from the group consisting of cesium carbonate, sodium hydrogen carbonate, sodium tetraphenylborate, disodium phenyl phosphate and potassium carbonate, and even more preferably at least one of cesium carbonate and potassium carbonate. One member of these second catalysts may be used, or a combination of two or more members of these second catalysts may be used.

The used proportion of the second catalyst in the step of preparing the aromatic polycarbonate prepolymer is, for example, $1 \times 10^{-6}$ mol or less, preferably $1 \times 10^{-8}$ mol to $1 \times 10^{-6}$ mol, and even more preferably $1 \times 10^{-7}$ mol to $1 \times 10^{-6}$ mol, per 1 mol total of the aromatic dihydroxy compounds.

The molar ratio of the used amounts of the first catalyst and the second catalyst is preferably 1:9 to 9:1, more preferably 3:7 to 8:2, even more preferably 4:6 to 7:3, and particularly preferably 5:5 to 7:3. The molar ratio is preferably applied in the case where the first catalyst and the second catalyst are both at least one member selected from the group consisting of alkali metal compounds and alkaline earth metal compounds.

Furthermore, the total used amount of the first catalyst and the second catalyst is, for example, $1 \times 10^{-6}$ mol or less, preferably $1 \times 10^{-8}$ mol to $1 \times 10^{-6}$ mol, and even more preferably $1 \times 10^{-7}$ mol to $1 \times 10^{-6}$ mol, per 1 mol total of the aromatic dihydroxy compounds used in the step of preparing the aromatic polycarbonate prepolymer.

The step of preparing the aromatic polycarbonate prepolymer is preferably performed in the coexistence of a co-catalyst in addition to the second catalyst (preferably at least one member selected from the group consisting of alkali metal compounds and alkaline earth metal compounds). By using the co-catalyst, the aromatic polycarbonate prepolymer can be more efficiently prepared.

As the co-catalyst, the nitrogen-containing compound in the transesterification catalyst is preferably used. The details of the nitrogen-containing compound are as described above. Specifically, as the co-catalyst, use of at least one member selected from the group consisting of quaternary ammonium hydroxides is preferable, use of at least one member selected from the group consisting of tetraalkylammonium hydroxides is more preferable, and use of tetramethylammonium hydroxide is even more preferable.

The used amount of the co-catalyst is, for example, $1 \times 10^{-3}$ mol or less, preferably $1 \times 10^{-7}$ mol to $1 \times 10^{-3}$ mol, and even more preferably $1 \times 10^{-6}$ mol to $1 \times 10^{-4}$ mol, per 1 mol total of the aromatic dihydroxy compounds.

In the step of preparing the aromatic polycarbonate prepolymer, the aromatic polycarbonate prepolymer is preferably produced by subjecting the aromatic dihydroxy compound and the diester carbonate which are the main raw materials to a polycondensation reaction in the presence of the second catalyst in a polycondensation reactor. This polycondensation reaction is a melt polycondensation reaction based on a transesterification reaction.

As the polycondensation reactor that performs the step of preparing the aromatic polycarbonate prepolymer, one or two or more reactors are used. When two or more reactors are used, the two or more reactors may be connected in series. As the reactors, preferably two or more, more preferably 2 to 6, and particularly preferably 3 to 5, reactors are connected in series for use. The polycondensation reactor may be a vertical type or a horizontal type, and preferably a vertical type.

Each of the polycondensation reactors can be provided with an agitation apparatus such as a conventionally known stirring blade. Specific examples of the stirring blade include anchor type stirring blades, Maxblend impellers, double helical ribbon impellers and the like.

In the case where the polycondensation reactor has a plurality of internal coils that are arranged substantially parallel to each other, the ratio of a distance A between centers of the adjacent internal coils to an outer diameter B of the internal coil (A/B) is preferably 1.6 to 4.0.

The reaction conditions in the polycondensation reactors are preferably set in a manner that achieves high temperature, high vacuum and low agitation speed, along with progress of the polycondensation reaction. During the polycondensation reaction, for example, the liquid level is preferably controlled so that the average retention time in each of the reactors is approximately 30 minutes to 120 minutes in the reactor before a linking agent is added. Furthermore, in each of the reactors, phenol that is produced simultaneously with the melt polycondensation reaction as a byproduct may be distilled off to the outside of the system through a distillation tube installed on each of the reactors.

The degree of pressure reduction in the step of preparing the aromatic polycarbonate prepolymer is preferably 0.0075 torr to 100 torr (1 Pa to 13.3 kPa), and the internal temperature of the reactor is preferably 140° C. to 300° C.

The rotational speed of the stirring blade of the reactor is not particularly limited but is preferably maintained at 10 rpm to 200 rpm. The polycondensation reaction is preferably performed by maintaining the liquid level at a certain level so as to make the average retention time a predetermined time, while phenol and the like, which are produced as byproducts along with progress of the reaction, are distilled off through the distillation tube. The average retention time in each of the reactors is not particularly limited but is typically 30 minutes to 120 minutes.

The weight average molecular weight of the aromatic polycarbonate prepolymer obtained in the step of preparing the aromatic polycarbonate prepolymer is not particularly limited but is preferably 10,000 to 50,000, and more preferably 15,000 to 35,000 (measured by GPC in terms of polystyrene).

In the aromatic polycarbonate prepolymer, at least a part of the terminal group is preferably capped with a terminal-capping group. The compound constituting the terminal-capping group is not particularly limited and, for example, an aromatic monohydroxy compound can be preferably used. The proportion of the amount of the terminal capping constituted by the aromatic monohydroxy compound relative to the total amount of all the terminals in the aromatic polycarbonate prepolymer is not particularly limited. For example, the proportion is 60 mol % or more, and preferably 80 mol % or more.

The terminal hydroxy group concentration of the aromatic polycarbonate prepolymer is preferably 1,500 ppm or less, more preferably 1,000 ppm or less, even more preferably 750 ppm or less, and particularly preferably 500 ppm or less. When the terminal hydroxy group concentration is within this range or when the amount of the terminal capping is within this range, a sufficiently high molecular weight aromatic polycarbonate resin tends to be obtained with good productivity.

In the present specification, the proportion of the amount of the terminal capping relative to the total amount of all the terminals in the polymer (including the aromatic polycarbonate prepolymer and the high molecular weight aromatic polycarbonate resin) and the hydroxy group concentration can be analyzed by $^1$H-NMR analysis of the polymer. Specific $^1$H-NMR analysis method is described in Examples below. The terminal hydroxy group concentration in the polymer can also be measured by spectroscopy using a Ti composite. Specifically, it is a method of measuring the terminal hydroxy group concentration (OH concentration) in the polymer by ultraviolet-visible spectroscopy (wavelength: 546 nm) of a composite formed from the polymer and titanium tetrachloride in a methylene chloride solution in accordance with a method described in Makromolekulare Chemie 88 (1965) 215-231. As the instrument, for example, the Hitachi U-3500 UV-VIS spectrophotometer can be used. The terminal hydroxy group concentration (OH concentration) in the polymer can be determined by using the results of ultraviolet-visible spectroscopy (wavelength: 546 nm) of composites formed from BPA having known concentrations and titanium tetrachloride as a reference.

"The total amount of all the terminals in the aromatic polycarbonate prepolymer" is calculated as follows: for example, if a polycarbonate having no branch (or a linear polycarbonate) is 0.5 mol, the total amount of all the terminals is calculated to be 1 mol.

Specific examples of the terminal-capping group include terminal groups derived from aromatic monohydroxy compounds, such as a phenyl group, a cresyl group, an o-tolyl group, a p-tolyl group, a p-tert-butylphenyl group, a biphenyl group, an o-methoxycarbonylphenyl group and a p-cumylphenyl group. Among these, a terminal group derived from an aromatic monohydroxy compound having a low boiling point, which is easily removed from the reaction system in the linking and high molecular weight achievement reaction with the dialcohol compound is preferable, and a phenyl group, a p-tert-butylphenyl group and the like are particularly preferable.

In the melting method, by using an excessive amount of the diester carbonate relative to the aromatic dihydroxy compound during the aromatic polycarbonate prepolymer production, the terminal-capping group can be introduced. Although devices to be used in the reaction and the reaction conditions are also taken into consideration, specifically, the used amount of the diester carbonate is 1.01 mol to 1.30 mol, more preferably 1.02 mol to 1.20 mol, and particularly preferably 1.03 mol to 1.15 mol, per 1 mol of the aromatic dihydroxy compound. By this, the aromatic polycarbonate prepolymer that satisfies the terminal capping amount described above can be obtained.

Third Step (A High Molecular Weight Achievement Step)

In the high molecular weight achievement step, a high molecular weight aromatic polycarbonate resin is produced by heat-treating the prepolymer mixture under reduced pressure conditions to achieve the high molecular weight.

The high molecular weight achievement step is preferably performed in a linking and high molecular weight achievement reactor (a transesterification polymerization vessel) connected in series to the prepolymer mixing tank of the second step. As the linking and high molecular weight achievement reactor used in the high molecular weight achievement step, one or two or more reactors can be used, but one reactor (a single reactor) is preferably used.

The prepolymer mixture may be transferred to the linking and high molecular weight achievement reactor through a transfer tube. The transfer tube that transfers the prepolymer mixture may be provided with a heating means. The transfer tube that transfers the prepolymer mixture may have the same aspect as that of the transfer tube of the catalyst composition.

Furthermore, a pressure adjusting valve may be arranged between the prepolymer mixing tank and the linking and high molecular weight achievement reactor, and the prepolymer mixture may be transferred from the prepolymer mixing tank to the linking and high molecular weight achievement reactor by using the pressure adjusting valve to apply backpressure to the prepolymer mixture.

The reduced pressure condition in the high molecular weight achievement step is, for example, 10 torr (1.33 kPa) or less, preferably 2.0 torr or less (267 Pa or less), more preferably 0.01 torr to 1.5 torr (1.3 Pa to 200 Pa), and even more preferably 0.01 torr to 1.0 torr (1.3 Pa to 133 Pa). The pressure in the high molecular weight achievement step may be detected by a pressure detecting means arranged on a branch tube arranged in the pressure reducing line installed on the linking and high molecular weight achievement reactor.

The temperature condition of the heat treatment in the high molecular weight achievement step is, for example, 240° C. to 320° C., preferably 260° C. to 310° C., and even more preferably 280° C. to 310° C.

Furthermore, the temperature condition of the heat treatment in the high molecular weight achievement step is preferably not higher than a temperature 80° C. higher than the temperature Tc of the prepolymer mixing tank or the prepolymer mixture transfer tube, and more preferably not higher than a temperature 50° C. higher than the temperature Tc.

In the high molecular weight achievement step, the oxygen concentration in the linking and high molecular weight achievement reactor is preferably 0.0001 vol % to 10 vol %, and more preferably 0.0001 vol % to 5 vol %. Because of this, oxidation degradation of the dialcohol compound can be efficiently suppressed. To achieve this oxygen concentration condition, it is preferable to replace the gas in the reactor with a gas having the oxygen concentration of 10 vol % or less (preferably an inert gas such as nitrogen and argon), and to further perform devolatilization.

As the linking and high molecular weight achievement reactor used in the high molecular weight achievement step, a horizontal type stirring reactor is used. Preferably, a single axis horizontal type stirring reactor that has one stirring shaft or a multi-axis horizontal type stirring reactor that has a plurality of stirring shafts is used, wherein at least one of the stirring shafts has a horizontal rotation shaft, and stirring blades that are installed substantially perpendicular to the horizontal rotation shaft and that are discontinuous to each other, and wherein when the length of the horizontal rotation shaft is L and the diameter of the rotation of the stirring blade is D, L/D is 1 to 15 and preferably 2 to 10. Among those described above, a multi-axis horizontal type stirring reactor that has a plurality of stirring shafts is more preferable.

Furthermore, a single axis horizontal type stirring reactor that has one continuous screw stirring shaft, which is representatively exemplified in extruders, or a multi-axis horizontal type stirring reactor that has a plurality of continuous screw stirring shafts can be also used, wherein L/D is 20 to 100 and more preferably 40 to 80, when the length of the stirring shaft is L and the screw diameter is D. Among those described above, a multi-axis horizontal type stirring reactor that has a plurality of stirring shafts is more preferable.

These horizontal type stirring reactors each preferably have a supply port of the prepolymer mixture and an outlet port of the produced high molecular weight polycarbonate resin located on the other side of the supply port.

The linking and high molecular weight achievement reactor can be provided with an agitation apparatus such as a conventionally known stirring blade. Specific examples of the stirring blade include two-axis type stirring blades, paddle blades, lattice blades, spectacle-shaped blades, extruder screw type blades, and the like.

Furthermore, the linking and high molecular weight achievement reactor can be provided with a discharge apparatus. The high molecular weight polycarbonate resin (polycarbonate copolymer) obtained in the linking and high molecular weight achievement reactor is a highly viscous resin having a fluidity of approximately 2,500 Pa·s at 280° C. (or the melt mass flow rate according to ISO 1133 of approximately 5.3 g/10 minutes) and may be difficult to discharge from the linking and high molecular weight achievement reactor, and thus use of a discharge apparatus is preferable. Specific examples of the discharge apparatus include a gear pump and a screw extractor, and a screw extractor is preferably used.

When the linking and high molecular weight achievement reactor has a discharge apparatus, pressure fluctuation of the outlet of the discharge apparatus is preferably 20% or less, and more preferably 0.1% to 20%.

Furthermore, each of the reactors may have a distillation tube to discharge byproducts and the like generated by the reaction, a condensing device such as a condenser or a dry ice trap, a receiver such as a recovery tank, a pressure reducing apparatus for maintaining a predetermined reduced pressure state, and the like.

Furthermore, the horizontal type stirring reactor preferably has a discharge apparatus of the obtained polycarbonate resin located on the other side of the supply port of the prepolymer mixture. As the discharge apparatus, a gear pump or a screw extractor is preferred, and a screw extractor is particularly preferably used.

Furthermore, as shaft sealing for the rotation shaft, a sealing mechanism including a mechanical seal is preferably employed.

To efficiently remove the aromatic monohydroxy compound generated as a byproduct, the surface renewing performance of the linking and high molecular weight achievement reactor used in the high molecular weight achievement step is not particularly limited, but the surface renewing effect expressed by Equation (II) below is preferably in the range of 0.01 to 500, more preferably in the range of 0.01 to 100, and particularly preferably in the range of 0.01 to 50.

$$\text{Surface renewing effect} = A \times Re^{0.5} \times n/V \quad \text{(II)}$$

A: Surface area ($m^2$)
n: Rotational speed/s
V: Liquid capacity ($m^3$)

Re (Reynolds number): $Re = \rho \times n \times r^2/\mu$
$\rho$: Liquid density ($kg/m^3$)
r: Diameter of agitator (m)
$\mu$: Liquid viscosity (kg/m·s)

The material of the reactor used in the manufacturing method for the high molecular weight aromatic polycarbonate resin is preferably at least one member selected from the group consisting of (a) metal materials having the iron content of 80 mass % or less and the Cr content of 18 mass % or more, or metal materials which are stainless steels such as SUS304, SUS316, SUS316L and SUS310S or clad materials and (b) glass materials, in a region occupying at least 90% of the total surface area of a portion of the reactor that is in contact with the raw material monomer or the reaction mixture (hereinafter, referred to as "a liquid contact portion"). When the material is glass, glass with which the eluted amount of alkali metal is 15 ppb/$cm^2$ or less when the glass is immersed in pure water at 50° C. for 120 hours is more preferable.

The liquid contact portions of all the reactors used in the manufacturing method for the high molecular weight aromatic polycarbonate resin are most preferably formed from the material described above; however, the liquid contact portions of all the reactors are not necessarily formed from the material described above, and at least the liquid contact portion of the linking and high molecular weight achievement reactor used in the high molecular weight achievement step is preferably formed from the material.

Furthermore, the reactor used in the manufacturing method for the high molecular weight aromatic polycarbonate resin is preferably electropolished in a region occupying at least 90% of the total surface area of the liquid contact portion.

The liquid contact portions of all the reactors used in the manufacturing method for the high molecular weight aromatic polycarbonate resin are most preferably electropolished; however, all the liquid contact portions of the reactors are not necessarily electropolished, and at least the liquid contact portion of the linking and high molecular weight achievement reactor used in the high molecular weight achievement step is preferably electropolished.

Specific examples of the preferable reactor described above are as follows; however, the present invention is not limited to these.

1) Specific examples of the multi-axis horizontal type stirring reactor that has a plurality of stirring shafts, wherein at least one of the stirring shafts has a horizontal rotation shaft, and stirring blades that are installed substantially perpendicular to the horizontal rotation shaft and that are discontinuous to each other and, wherein when the length of the horizontal rotation shaft is L and the diameter of the rotation of the stirring blade is D, L/D is 1 to 15, include Spectacle-shaped blade polymerizer (manufactured by Hitachi, Ltd.), Continuous LIST Kneader Reactor (manufactured by LIST), AP-Reactor (manufactured by LIST), SCR (manufactured by Mitsubishi Heavy Industries, Ltd.) and KRC Reactor (manufactured by Kurimoto, Ltd.).

2) Specific examples of the single axis horizontal type stirring reactor that has one stirring shaft, wherein the stirring shaft has a horizontal rotation shaft, and stirring blades that are installed substantially perpendicular to the horizontal rotation shaft and that are discontinuous to each other and, wherein when the length of the horizontal rotation shaft is L and the diameter of the rotation of the stirring blade is D, L/D is 1 to 15, include Continuous LIST Kneader Reactor (manufactured by LIST).

3) Specific examples of the multi-axis horizontal type stirring reactor that has a plurality of continuous screw stirring shafts, wherein L/D is 20 to 100 when the length of the stirring shaft is L and the screw diameter is D, include Twin-screw extruder TEX series (manufactured by The Japan Steel Works, Ltd.), Twin-screw extruder TEM series (manufactured by Toshiba Machine Co., Ltd.) and ZSK type Twin-screw extruders (manufactured by Werner & Pfleiderer).

4) Specific examples of the single axis horizontal type stirring reactor that has one continuous screw stirring shaft, wherein L/D is 20 to 100 when the length of the stirring shaft is L and the screw diameter is D, include Buss Co-kneader (manufactured by Buss).

The manufacturing method for the high molecular weight aromatic polycarbonate resin preferably further includes a cyclic carbonate removal step that removes at least a part of the cyclic carbonate generated in the high molecular weight achievement step to the outside of the reaction system. More preferably, the cyclic carbonate removal step includes a step that removes a distillate containing at least a part of the cyclic carbonate generated in the high molecular weight achievement step to the outside of the reaction system.

That is, in the high molecular weight achievement step, because the aromatic polycarbonate prepolymer is reacted with the dialcohol compound as a linking agent to achieve a high molecular weight and because at least a part of the cyclic carbonate generated as a byproduct through the reaction is removed to the outside of the reaction system, the high molecular weight achievement reaction of the aromatic polycarbonate prepolymer further efficiently proceeds.

The high molecular weight achievement step and the cyclic carbonate removal step can be physically and temporally separate steps or can be performed at the same time, and preferably are performed at the same time.

The cyclic carbonate that is generated as a byproduct is preferably a compound having a structure represented by General Formula (2a) below.

[Chemical Formula 9]

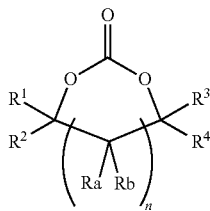

(2a)

In General Formula (2a), Ra and Rb may represent each independently a hydrogen atom, a halogen atom, a linear or branched alkyl group that may have an oxygen atom or a halogen atom and that has 1 to 30 carbons, a cycloalkyl group that may have an oxygen atom or a halogen atom and that has 3 to 30 carbons, an aryl group that may have an oxygen atom or a halogen atom and that has 6 to 30 carbons, or an alkoxy group that may have an oxygen atom or a halogen atom and that has 1 to 15 carbons, or Ra and Rb may be bonded to each other to form a ring. As the halogen atom, a fluorine atom is preferable.

$R^1$ to $R^4$ each independently represent a hydrogen atom, a halogen atom, or a linear or branched alkyl group having 1 to 5 carbons. As the halogen atom, a fluorine atom is preferable.

n is an integer of 1 to 30, preferably 1 to 6, more preferably 1 to 3, and particularly preferably 1.

In General Formula (2a), Ra and Rb preferably may represent each independently a hydrogen atom, a halogen atom, a linear or branched alkyl group having 1 to 8 carbons, a cycloalkyl group having 3 to 8 carbons, an aryl group having 6 to 10 carbons, or an alkoxy group having 1 to 8 carbons, or Ra and Rb may be bonded to each other to form an alicyclic ring having 3 to 8 carbons. As the halogen atom, a fluorine atom is preferable.

$R^1$ to $R^4$ preferably each independently represent a hydrogen atom, a fluorine atom or a methyl group.

n preferably represents an integer of 1 to 6.

In General Formula (2a), Ra and Rb more preferably represent each independently a hydrogen atom, or a linear or branched alkyl group having 1 to 5 carbons, and even more preferably a linear or branched alkyl group having 1 to 4 carbons. Particularly preferable specific examples thereof include a methyl group, an ethyl group, a propyl group, a n-butyl group and an isobutyl group. $R^1$ to $R^4$ are more preferably each a hydrogen atom. n more preferably represents an integer of 1 to 3.

The cyclic carbonate represented by General Formula (2a) above is more preferably a compound represented by General Formula (2b) below. In General Formula (2b), Ra and Rb each the same as those described in General Formula (2a) above.

[Chemical Formula 10]

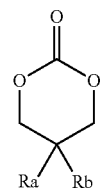

(2b)

Specific examples of the cyclic carbonate include compounds having the following structures.

[Chemical Formula 11]

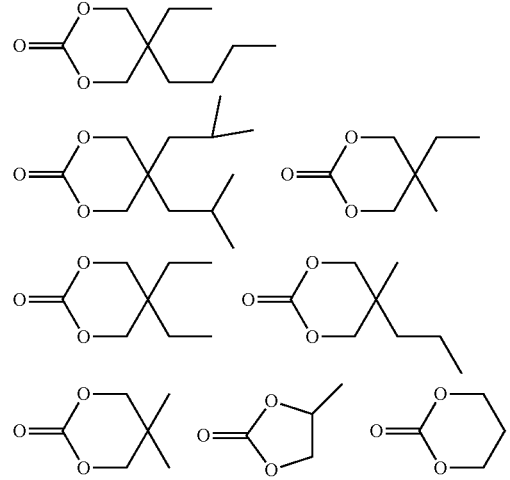

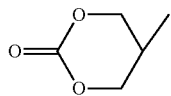

The manufacturing method of the present embodiment that uses the dialcohol compound having the structure represented by General Formula (1) is advantageous due to the fact that the high molecular weight can be achieved fast compared to a conventional manufacturing method of a polycarbonate by a melting method.

On the other hand, in the manufacturing method of the present embodiment, a cyclic carbonate having a particular structure may be generated as a byproduct, as the high molecular weight achievement reaction proceeds. After the byproduct cyclic carbonate is removed to the outside of the reaction system, a high molecular weight polycarbonate resin having a backbone that is substantially the same as a backbone of a homopolycarbonate resin can be obtained. The byproduct cyclic carbonate has a structure that corresponds to the dialcohol compound used in the high molecular weight achievement step, and it is conceived that the byproduct cyclic carbonate is a cyclic body derived from the dialcohol compound; however, the reaction mechanism on which the cyclic carbonate is generated as a byproduct along with such a high molecular weight achievement reaction is not necessarily clearly known.

The aromatic polycarbonate resin that achieved a high molecular weight by the manufacturing method that uses the dialcohol compound having the structure represented by General Formula (1) contains almost no structural units derived from the dialcohol compound and has the resin backbone that is substantially the same as a backbone of a homopolycarbonate resin.

That is, the structural unit derived from the dialcohol compound, which is the linking agent, is not contained by the backbone or, even when it is contained, the contained amount is significantly small, and thus significantly high thermal stability and excellent heat resistance are achieved. Meanwhile, while the same backbone as a backbone of a conventional homopolycarbonate resin is contained, the aromatic polycarbonate resin has excellent quality such as a low N value (structural viscosity index), excellent fluidity, small proportion of units containing heterologous structures and excellent color.

When the backbone of the aromatic polycarbonate resin that achieved a high molecular weight and that is obtained by the manufacturing method for the high molecular weight aromatic polycarbonate resin contains a structural unit derived from the dialcohol compound, the proportion of the amount of the structural unit derived from the dialcohol compound relative to the total structural unit amount of the aromatic polycarbonate resin that achieved a high molecular weight is 1 mol % or less, and more preferably 0.1 mol % or less.

Specific examples of the method of removing the byproduct cyclic carbonate to the outside of the reaction system include a method that distils off the distillate produced in the high molecular weight achievement step to the outside of the reaction system. That is, the byproduct cyclic carbonate is distilled off from the reaction system together with aromatic monohydroxy compounds that are generated similarly as byproducts in the same step, such as phenol, and unreacted raw material compounds (a dialcohol compound, a diester carbonate and the like) as a distillate containing these compounds. The distillation conditions are not particularly limited; however, the temperature in the reactor when the distillate is removed from the reaction system is preferably 240° C. to 320° C., more preferably 260° C. to 310° C., and even more preferably 280° C. to 310° C.

The removal is performed for at least a part of the byproduct cyclic carbonate. All of the byproduct cyclic carbonate is most preferably removed; however, typically, it is difficult to completely remove the byproduct cyclic carbonate. When complete removal is not possible, it is acceptable even if the cyclic carbonate remains in the aromatic polycarbonate resin which has become a product. In the product, a preferable upper limit of the remained amount is 3,000 ppm, a more preferable upper limit is 1,000 ppm, an even more preferable upper limit is 500 ppm, and a particularly preferable upper limit is 300 ppm.

One of the characteristics of the manufacturing method of the present embodiment is that a high molecular weight can be achieved in a short period of time from the start of the high molecular weight achievement step.

More specifically, according to the manufacturing method of the present embodiment, the relationship between the weight average molecular weight of the aromatic polycarbonate prepolymer (MwPP) and the weight average molecular weight of the high molecular weight aromatic polycarbonate resin obtained in the high molecular weight achievement step (Mw) can be expressed by Equation (IV) below. In Equation (IV) below, k' (unit: an amount of Mw increase/minute) is a number of 400 or more.

$$(Mw-Mw_{PP})/\text{heating time(minute)}=k' \quad \text{(IV)}$$

According to the manufacturing method of the present embodiment, the number k' in Equation (IV) above can be 400 or more, and preferably 500 or more. That is, a predetermined high molecular weight can be efficiently achieved by increasing the molecular weight in a short period of time from the start of the reaction in the high molecular weight achievement step.

The weight average molecular weight (Mw) of the high molecular weight aromatic polycarbonate resin obtained in the manufacturing method of the present embodiment is preferably 35,000 to 100,000, more preferably 35,000 to 80,000, and particularly preferably 40,000 to 75,000.

The polycarbonate resin having a high molecular weight is suitable for use in blow molding, extrusion molding and the like because a draw down less likely occurs due to its high melt tension. Furthermore, even when the polycarbonate resin is used for injection molding, excellent moldability is achieved without causing stringing or the like. Furthermore, the obtained molded product achieves excellent physical properties such as mechanical properties, heat resistance and organic solvent resistance.

In the high molecular weight aromatic polycarbonate resin obtained in the manufacturing method of the present embodiment, N value (structural viscosity index) expressed by Equation (I) below is preferably 1.30 or less, more preferably 1.28 or less, even more preferably 1.25 or less, and particularly preferably 1.22 or less.

$$N \text{ value}=(\log(Q160 \text{ value})-\log(Q10 \text{ value}))/(\log 160-\log 10) \quad \text{(I)}$$

In Equation (I) above, Q160 value represents a melt flow volume per unit time (mL/sec) measured at 280° C. and a load of 160 kg (measured by using CFT-500D type manufactured by Shimadzu Corporation (hereinafter the same) and calculated by stroke=7.0 mm to 10.0 mm), and Q10 value represents a melt flow volume per unit time (mL/sec)

measured at 280° C. and a load of 10 kg (calculated by stroke=7.0 mm to 10.0 mm). Note that the nozzle diameter is 1 mm, and the nozzle length is 10 mm.

Structural viscosity index "N value" is an indicator of the degree of branching of the aromatic polycarbonate resin. In the high molecular weight aromatic polycarbonate resin obtained by the manufacturing method of the present embodiment, the N value is low, the proportion of branched structure is small, and the proportion of linear structure is high. Although aromatic polycarbonate resins typically tend to have a high fluidity (a high Q value) for the same Mw even when the proportion of branched structure is increased, the high molecular weight aromatic polycarbonate resin obtained in the continuous manufacturing method of the present embodiment achieves a high fluidity (a high Q value) while a low N value is maintained.

The high molecular weight aromatic polycarbonate resin obtained by the manufacturing method of the present embodiment exhibits excellent color.

The color evaluation of an aromatic polycarbonate resin is typically shown in YI value. Typically, the YI value of an aromatic polycarbonate resin obtained by interfacial polymerization is 0.8 to 1.0. On the other hand, a high molecular weight body of an aromatic polycarbonate obtained by a melt polymerization method has the YI value of 1.7 to 2.0 due to deterioration of quality caused by a manufacturing process. However, the YI value of the high molecular weight aromatic polycarbonate resin obtained by the manufacturing method of the present embodiment is equivalent to the YI value of an aromatic polycarbonate obtained by interfacial polymerization, and no deterioration in color is observed.

The high molecular weight aromatic polycarbonate resin obtained by the manufacturing method of the present embodiment has excellent quality with a less content of structural units having heterologous structures. The structural unit having a heterologous structure indicates a structural unit having a structure that may have a negative effect, and examples thereof include branching structural units which are contained in a large amount by a polycarbonate obtained by a conventional melt method. The structural units having heterologous structures can be either present as repeating structures or present randomly in a backbone of a polycarbonate resin.

The amount of the heterologous structures in the aromatic polycarbonate resin is, for example, preferably 1,000 ppm or less, and more preferably 800 ppm or less, in all the structural units, in terms of the content of the heterologous structure having a partial structure derived from a salicylic acid (PSA).

The terminal hydroxy group concentration contained by the high molecular weight aromatic polycarbonate resin obtained by the manufacturing method of the present embodiment is not particularly limited and is appropriately selected depending on the purpose and the like. The terminal hydroxy group concentration is, for example, 1,000 ppm or less, and preferably 600 ppm or less.

The manufacturing method for the high molecular weight aromatic polycarbonate resin can include a step of adding a catalyst deactivator to the aromatic polycarbonate resin having an increased molecular weight. It is generally preferable to deactivate the catalyst by addition of a known acidic substance. Specific examples of such a substance (a catalyst deactivator) include aromatic sulfonic acids, such as p-toluenesulfonic acid; aromatic sulfonic acid esters, such as butyl paratoluenesulfonate; aromatic sulfonic acid salts, such as tetrabutylphosphonium dodecylbenzenesulfonate and tetrabutylammonium paratoluenesulfonate; organic halides, such as stearoyl chloride, butyryl chloride, benzoyl chloride, toluenesulfonyl chloride and benzyl chloride; alkylsulfates, such as dimethylsulfate; phosphoric acids; phosphorous acids; and the like.

Among these, a catalyst deactivator selected from the group consisting of paratoluenesulfonic acid, butyl paratoluenesulfonate, tetrabutylphosphonium dodecylbenzenesulfonate and tetrabutylammonium paratoluenesulfonate is preferably used.

As the addition of the catalyst deactivator, the catalyst deactivator can be mixed to the polycarbonate resin by using a conventionally known method after the termination of the high molecular weight achievement reaction. For example, a method, in which the catalyst deactivator is mixed and dispersed with a high-speed mixer, such as a tumbling mixer, a Henschel mixer, a ribbon blender and a super mixer, and thereafter the mixture is melt kneaded with an extruder, a Banbury mixer, a roll or the like, is appropriately selected.

After the deactivation of the catalyst, a step of devolatilizing and removing low boiling-point compounds in the high molecular weight aromatic polycarbonate resin at a temperature of 200° C. to 350° C. under a pressure of 0.013 kPa to 0.13 kPa (0.1 torr to 1 torr) may be performed. To perform this step, it is preferable to use a horizontal type apparatus equipped with a stirring blade having excellent surface renewing performance, such as a paddle blade, a lattice blade and a spectacle-shaped blade, or to use a thin-film evaporator.

The apparatus is preferably a twin-screw extruder or a horizontal type reactor having a polymer seal and a vent structure.

The manufacturing method for the high molecular weight aromatic polycarbonate resin can further include a step of adding a heat stabilizer, a hydrolysis stabilizer, an antioxidant, a pigment, a dye, a reinforcing agent, a filler, a UV absorber, a lubricant, a mold release agent, a nucleating agent, a plasticizer, a fluidity improver, an antistatic agent or the like.

As the heat stabilizer, a publicly known heat stabilizer, such as triphenylphosphine ($P$-$Ph_3$), can be used.

Examples of the antioxidant include tris(2,4-di-tert-butylphenyl) phosphite, n-octadecyl-β-(4'-hydroxy-3',5'-di-tert-butylphenyl) propionate, pentaerythrityl-tetrakis[3-(3,5-di-tert-butyl-4-hydroxyphenyl) propionate], 1,6-hexanediolbis[3-(3,5-di-tert-butyl-4-hydroxyphenyl) propionate, triethylene glycol-bis-3-(3-tert-butyl-4-hydroxy-5-methylphenyl) propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, triphenyl phosphite, trisnonylphenyl phosphite, tris-(2,4-di-tert-butylphenyl) phosphite, tetrakis(2,4-di-tert-butylphenyl)-4,4'-biphenylene diphosphonite, tricresyl phosphite, 2,2-methylenebis(4,6-di-tert-butylphenyl)octyl phosphite and the like. Among these, tris(2,4-di-tert-butylphenyl) phosphite and n-octadecyl-β-(4'-hydroxy-3',5'-di-tert-butylphenyl) propionate are preferable.

These additives can be mixed to the polycarbonate resin by using a conventionally known method, similarly to the catalyst deactivator. For example, a method, in which each component is mixed and dispersed with a high-speed mixer, such as a tumbling mixer, a Henschel mixer, a ribbon blender and a super mixer, and thereafter the mixture is melt kneaded with an extruder, a Banbury mixer, a roll or the like, is appropriately selected. The step of adding the additive may be performed simultaneously with or separately from the addition of the catalyst deactivator.

According to the manufacturing method of the present embodiment, in the manufacturing method of the high molecular weight aromatic polycarbonate resin, in which the aromatic polycarbonate prepolymer and the catalyst composition containing the dialcohol compound and the first catalyst are mixed in advance in a mixer, and then the obtained mixture is fed to the linking and high molecular weight achievement reactor to perform the linking and high molecular weight achievement reaction, the first catalyst can be accurately and stably fed due to the addition of the first catalyst in advance to the dialcohol compound, and it becomes possible to further suppress the amount of heterologous structures that are naturally generated and that are characteristic of a melt method. As a result, a high quality high molecular weight polycarbonate resin which has a low N value and excellent color and in which increase of heterologous structures is significantly suppressed can be efficiently produced by a melt method.

The manufacturing method for the high molecular weight aromatic polycarbonate resin may be performed either in a batch-wise manner or in a continuous manner. An example of the manufacturing method performed in a continuous manner is more specifically described below with reference to the drawings; however, the present invention is not limited to this. Note that, in FIG. 1, the first step (the step of producing the catalyst composition) is the linking agent preparation step, the step of mixing the catalyst composition and the aromatic polycarbonate prepolymer in the second step is a step performed in a mixer 6Mix, and the third step is the linking polymerization step. Furthermore, the step of preparing the aromatic polycarbonate prepolymer (the fourth step) is the polycondensation step.

In an example of the continuous manufacturing method depicted in FIG. 1, the high molecular weight aromatic polycarbonate resin is manufactured by a main raw material preparation step in which an aromatic dihydroxy compound and a diester carbonate, which are main raw materials, are prepared; a polycondensation step in which these raw materials in molten states are subjected to polycondensation reaction to produce an aromatic polycarbonate prepolymer (the step of preparing an aromatic polycarbonate prepolymer (the fourth step), which is hereinafter also referred to as "Step (A)"); then, a step in which, a catalyst composition produced by mixing a dialcohol compound (a linking agent) and a catalyst in a linking agent preparation step (the first step) is added to the aromatic polycarbonate prepolymer obtained in the Step (A) to form a prepolymer mixture (the second step; hereinafter, also referred to as "Step (B)"); and a step in which the prepolymer mixture obtained in the Step (B) is subjected to a linking and high molecular weight achievement reaction under reduced pressure conditions (the third step; hereinafter, also referred to as "Step (C)").

Then, pellets of the high molecular weight aromatic polycarbonate resin are formed through a step (not shown) in which the reaction is terminated and the unreacted raw materials, reaction byproducts and the like in the polymerization reaction solution are removed by devolatilization, a step (not shown) in which a heat stabilizer, a mold release agent, a colorant or the like is added, and a step (not shown) in which the high molecular weight aromatic polycarbonate resin is formed into pellets having a predetermined particle size.

The manufacturing method depicted in FIG. 1 employs a multi-stage reaction process, and Step (A) and Step (C) are performed using separate reactors. The polycondensation reactor used for performing Step (A) and the linking and high molecular weight achievement reactor (a transesterification reactor) used for performing Step (C) are connected in series through the mixer used for performing Step (B). The catalyst composition that is fed to Step (B) is preferably prepared by melting a dialcohol compound in another reactor, adding and mixing or dispersing a transesterification catalyst, such as an alkali metal compound and/or an alkaline earth metal compound, in the form of an aqueous solution and/or an organic solution into the molten dialcohol compound, and then subjecting the resultant mixture to dehydration treatment and/or devolatilization treatment.

The polycondensation reactor in Step (A) may be constituted by a single reactor or may be constituted by a plurality of reactors connected in series. Preferably two or more reactors, and more preferably 2 to 6 reactors, are connected in series.

On the other hand, the linking and high molecular weight achievement reactor in Step (C) may be constituted by a single reactor or may be constituted by a plurality of reactors connected in series, but is preferably constituted by one reactor (a single reactor).

The reactor that prepares the catalyst composition that is fed to Step (B) is preferably provided with two or more reactors to perform the reaction continuously.

In the main raw material preparation step, an aromatic dihydroxy compound and a diester carbonate, which are main raw materials, are prepared.

The apparatus used in the main raw material preparation step, is provided with raw material mixing tanks (1Ra and 1Rb in FIG. 1) and a raw material feed pump (1P in FIG. 1) for feeding the prepared raw materials to the polycondensation step. An aromatic dihydroxy compound and a diester carbonate, which are main raw materials, are continuously fed in a molten state to the raw material mixing tanks 1Ra and 1Rb through supply ports 1Ma and 1Mb under a nitrogen gas atmosphere. In the raw material mixing tanks 1Ra and 1Rb, the aromatic dihydroxy compound and the diester carbonate in a predetermined molar ratio (preferably, diester carbonate/aromatic dihydroxy compound=1.01 to 1.30 (molar ratio)) are mixed with each other and molten under a nitrogen gas atmosphere to prepare a molten raw material mixture. The specifications of the raw material mixing tanks 1Ra and 1Rb are not particularly limited, and conventionally known tanks can be used. For example, tanks equipped with Maxblend stirring impellers (1Ya and 1Yb in FIG. 1) can be used.

To perform continuous production, two mixing tanks are preferably used in the main raw material preparation step as depicted in FIG. 1. By using two mixing tanks, mixing and melting can be alternately performed and switching a valve 1Bp enables the resultant mixture to be continuously fed to a reactor 3R.

As a polycondensation reactor for performing Step (A), one reactor or two or more reactors are used. When two or more reactors are used, the reactors are connected in series. Preferably two or more reactors, more preferably 2 to 6 reactors, especially preferably 3 to 5 reactors are used and connected in series. The polycondensation reactor may be either a vertical type or a horizontal type, and is preferably a vertical type.

For example, in FIG. 1, as polycondensation reactors of Step (A), a first vertical stirring reactor 3R, a second vertical stirring reactor 4R, a third vertical stirring reactor 5R and a fourth vertical stirring reactor 6R are provided.

Each of the polycondensation reactors can be provided with an agitation apparatus such as a conventionally known stirring blade. Specific examples of the stirring blade include anchor type stirring blades, Maxblend impellers, double helical ribbon impellers and the like.

For example, in FIG. 1, the first vertical stirring reactor 3R, the second vertical stirring reactor 4R and the third vertical stirring reactor 5R are provided with Maxblend impellers 3Y, 4Y and 5Y, respectively, and the fourth vertical stirring reactor 6R is provided with a double helical ribbon impeller 6Y.

Furthermore, each of the reactors may have a preheater, a gear pump, a distillation tube to discharge byproducts and the like generated by the polycondensation reaction, a condensing device such as a condenser or a dry ice trap, a receiver such as a recovery tank, a pressure reducing apparatus for maintaining a predetermined reduced pressure state, and the like.

Control over all the reactors used in the series of continuous manufacturing method is started so that the internal temperatures and pressures reach those in their respective preset ranges.

In an example of the continuous manufacturing method using the manufacturing apparatus depicted in FIG. 1, first, with respect to the five reactors connected in series (Step (A): the first vertical stirring reactor 3R, the second vertical stirring reactor 4R, the third vertical stirring reactor 5R and the fourth vertical stirring reactor 6R; Step (B): the mixer (6Mix); and Step (C): the fifth horizontal stirring reactor 7R), the internal temperatures and pressures are in advance set according to their respective reactions (the melt polycondensation reaction and the linking and high molecular weight achievement reaction).

For example, the apparatus in FIG. 1 are provided with preheaters 3H, 4H, 5H and 6H and gear pumps 3P, 4P, 5P and 6P. In the four reactors, distillation tubes 3F, 4F, 5F and 6F are respectively installed. The distillation tubes 3F, 4F, 5F and 6F are respectively connected to the condensing devices 3C, 4C, 5C and 6C, and the reactors are respectively maintained in predetermined reduced pressure states by pressure reducing apparatuses 3V, 4V, 5V and 6V.

The reaction conditions in the polycondensation reactors are respectively set in a manner that achieves high temperature, high vacuum and low agitation speed, along with progress of the polycondensation reaction. During the polycondensation reaction, the liquid level is controlled so that the average retention time in each of reactors becomes approximately 30 minutes to 120 minutes in the reactor before addition of a linking agent, for example. Furthermore, in each of the reactors, phenol that is produced simultaneously with the melt polycondensation reaction as a byproduct is distilled off to the outside of the system through a distillation tube 3F, 4F, 5F or 6F installed on each of the reactors. The degree of pressure reduction in the Step (A) is preferably 0.0075 torr to 100 torr (1 Pa to 13.3 kPa), and the internal temperature of the reactor is preferably 140° C. to 300° C.

More specifically, in the method depicted in FIG. 1, Step (A) is performed using the four reactors (the first to fourth vertical stirring reactors), and, generally, the temperatures and pressures are set as described below. Note that the mixer of Step (B) and the linking and high molecular weight achievement reactor (the fifth horizontal stirring reactor) of Step (C) connected in series to the four reactors of Step (A) are also described below.

(Preheater 1H) 180° C. to 230° C.
(First vertical stirring reactor 3R)
Internal temperature: 150° C. to 250° C.; Pressure: 200 torr (26.6 kPa) to atmospheric pressure; Temperature of the heating medium: 220° C. to 280° C.

(Preheater 3H) 200° C. to 250° C.
(Second vertical stirring reactor 4R)
Internal temperature: 180° C. to 250° C.; Pressure: 100 torr (13.3 kPa) to 200 torr (26.6 kPa); Temperature of the heating medium: 220° C. to 280° C.
(Preheater 4H) 230° C. to 270° C.
(Third vertical stirring reactor 5R)
Internal temperature: 220° C. to 270° C.; Pressure: 1 torr (133 Pa) to 100 torr (13.3 kPa); Temperature of the heating medium: 220° C. to 280° C.
(Preheater 5H) 230° C. to 270° C.
(Fourth vertical stirring reactor 6R)
Internal temperature: 220° C. to 280° C.; Pressure: 0.0075 torr (1 Pa) to 1 torr (133 Pa); Temperature of the heating medium: 220° C. to 300° C.
(Preheater 6H) 270° C. to 340° C.
(Mixer 6Mix)
Internal temperature: 220° C. to 300° C.; Pressure: 200 torr (26.6 kPa) to 3,700 torr (0.5 MPa); Temperature of the heating medium: 220° C. to 320° C.
(Fifth horizontal stirring reactor 7R)
Internal temperature: 260° C. to 340° C.; Pressure: 10 torr or less (1,333 Pa or less); Temperature of the heating medium: 260° C. to 340° C.

Then, after the internal temperatures and pressures of all the reactors used in the continuous manufacturing method according to the present embodiment have reached those in the range of −5% to +5% of their respective preset values, the molten raw material mixture separately prepared in the raw material mixing tanks 1R (1Ra and 1Rb) is continuously fed into the first vertical stirring reactor 3R through the raw material feed pump 1P and the preheater 1H. Furthermore, simultaneously with the start of feeding of the molten raw material mixture, the catalyst is continuously fed into the first vertical stirring reactor 3R from a catalyst supply port 1Cat in the transfer tube of the molten raw material mixture to initiate a melt polycondensation based on a transesterification reaction.

The rotational speed of the stirring blade of the reactor is not particularly limited but is preferably maintained at 200 rpm to 10 rpm. The polycondensation reaction is performed by maintaining the liquid level at a certain level so as to make the average retention time a predetermined time while phenol, which is produced as a byproduct along with progress of the reaction, is distilled off through the distillation tube. The average retention time in each of the reactors is not particularly limited but is typically 30 minutes to 120 minutes.

For example, in the manufacturing apparatus depicted in FIG. 1, melt polycondensation is performed in the first vertical stirring reactor 3R under a nitrogen atmosphere, for example, at a temperature of 200° C. and a pressure of 200 torr (27 kPa) while the rotational speed of the Maxblend impeller 3Y is maintained at 160 rpm. Thereafter, the polycondensation reaction is performed by maintaining the liquid level at a certain level so that the average retention time becomes 60 minutes while phenol which is produced as a byproduct is distilled off through a distillation tube 3F.

Subsequently, the polymerization reaction solution is discharged by the gear pump 3P from the bottom of the first vertical stirring reactor 3R, and continuously fed successively to the second vertical stirring reactor 4R through the preheater 3H, and then to the third vertical stirring reactor 5R through the preheater 4H by the gear pump 4P, and further to the fourth vertical stirring reactor 6R through the preheater 5H by the gear pump 5P, and thus a polycondensation reaction proceeds to form an aromatic polycarbonate prepolymer.

The aromatic polycarbonate prepolymer obtained in the polycondensation reactor (the last reactor when a plurality of reactors are used in Step (A)) is fed to the mixer in Step (B). On the other hand, the catalyst composition, which was melted in a linking agent preparation apparatus and mixed with a catalyst solution, and then subjected to dehydration or devolatilization treatment under reduced pressure, is directly fed to the mixer from the linking agent feeding apparatus. The aromatic polycarbonate prepolymer and the catalyst composition fed to the mixer are mixed with each other in the mixer, and the resultant prepolymer mixture is continuously fed to the linking and high molecular weight achievement reactor in Step (C).

For example, in the manufacturing apparatus depicted in FIG. 1, the prepolymer discharged from the fourth vertical stirring reactor 6R is successively continuously fed by the gear pump 6P to the mixer 6Mix through the preheater 6H.

When the catalyst composition containing the catalyst and the dialcohol compound (the linking agent) is fed to the mixer in Step (B), the catalyst composition is in advance prepared in the linking agent preparation tank or the like and then fed. For example, in the linking agent preparation apparatuses (2Ra and 2Rb), the dialcohol compound is melted into a liquid form. At this time, the viscosity of the dialcohol compound is preferably 0.1 P to 10,000 P (poise; 0.01 Pa·s to 1,000 Pa·s), and more preferably 1 P to 100 P (poise; 0.1 Pa·s to 10 Pa·s). When the viscosity of the dialcohol compound is in such a range, the dialcohol compound can be stably and quantitatively fed to the linking and high molecular weight achievement reactor, enabling a reaction of the dialcohol compound and the aromatic polycarbonate prepolymer to proceed uniformly and rapidly. Furthermore, a catalyst solution (an aqueous solution and/or an organic solution) is introduced through catalyst solution introducing lines (2Cata and 2Catb). The catalyst is stirred by stirring blades (2Ya and 2Yb) and mixed or dispersed, and water and/or an organic solvent is removed from the catalyst composition through dehydration or devolatilization lines (2Fa and 2Fb). The catalyst composition in a molten state is preferably subjected to dehydration treatment or devolatilization treatment. To achieve dehydration to an extent such that the linking and high molecular weight achievement reaction is not adversely affected, the dehydration treatment or devolatilization treatment is performed under a reduced pressure at, for example, 300 torr (40 kPa) or less, preferably 100 torr (13.3 kPa) or less, and more preferably 0.01 torr (1.3 Pa) to 100 torr (13.3 kPa). A preferred temperature set for the dehydration treatment varies depending on the type of the dialcohol compound since the melt viscosity varies depending on the type of the dialcohol compound; however, the dehydration treatment is performed at a temperature not lower than the melting point of the dialcohol compound, preferably in a temperature range from the melting point to the temperature 80° C. higher than the melting point, and more preferably in a temperature range from the melting point to the temperature 50° C. higher than the melting point. The yardstick of the dehydration treatment is not particularly limited, but the water content in the catalyst composition after the dehydration treatment is preferably 3 mass % or less, more preferably 1 mass % or less, even more preferably 0.3 mass % or less, and particularly preferably 0.03 mass % or less. By this operation, more quantitative and stable feeding of the catalyst composition is possible.

For example, when 2-butyl-2-ethyl-1,3-propane glycol (BEPG) is used as the dialcohol compound which is a linking agent, because the melting point of the BEPG is approximately 43° C., the BEPG is melted at, for example, 75° C. to 80° C., and a predetermined amount of an aqueous catalyst solution is added to the BEPG and then the resultant mixture is subjected to dehydration at 1 torr for approximately 30 minutes as a yardstick while being stirred.

The linking agent preparation apparatuses (2Ra and 2Rb) are vessels capable of heating to 50° C. to 200° C., and the stirring blades (2Ya and 2Yb) installed on the linking agent preparation apparatuses (2Ra and 2Rb) can be general stirring blades, such as anchor blades, paddle blades, turbine blades, anchor type stirring blades, Maxblend stirring impellers, helical ribbon stirring impellers and lattice blades, and the form of the stirring blade is not particularly limited as long as it is capable of stirring.

Note that, in the continuous manufacturing method, two linking agent preparation apparatuses are preferably used in the linking agent preparation step as depicted in FIG. 1. By using two linking agent preparation apparatuses, mixing and melting can be alternately performed and switching a valve 2Bp enables the catalyst composition to be continuously fed to the mixer 6Mix through a linking agent constant feeding pump 2P and a transfer tube 2La.

The prepolymer mixture discharged from the mixer 6Mix is successively continuously fed to the fifth horizontal stirring reactor 7R, and, in the fifth horizontal stirring reactor 7R, the linking and high molecular weight achievement reaction proceeds under temperature and pressure conditions suitable for performing the linking and high molecular weight achievement reaction. Phenol that is produced as a byproduct and a part of the unreacted monomers are removed to the outside of the system through a vent conduit 7F.

To prevent the catalyst composition from solidifying, in the feeding line (feeding pipe) for the catalyst composition and devices, such as a valve and a pump, duplex tubes and jacket type devices, in which the catalyst composition flows in the inner side and a heating medium flows in the outer side, can be used, and more preferably devices, such as a full-jacket type valve and pump can be used.

In Step (C), the retention time of the reaction mixture in the linking and high molecular weight achievement reactor (a period of time required until the obtained high molecular weight polycarbonate resin is discharged after the prepolymer mixture is fed) tends to depend on the used reaction apparatus (a reactor) and thus cannot be generally defined, but is preferably 60 minutes or less, more preferably 1 minute to 60 minutes, more preferably 5 minutes to 60 minutes, even more preferably 20 minutes to 60 minutes, yet even more preferably 25 minutes to 60 minutes, and particularly preferably 30 minutes to 60 minutes.

According to the manufacturing method of the present embodiment in which the aromatic polycarbonate prepolymer and the catalyst composition are mixed in advance in a mixer and then continuously fed to the linking and high molecular weight achievement reactor to perform the linking and high molecular weight achievement reaction, the catalyst composition can be accurately and stably fed, and it becomes possible to further suppress the amount of heterologous structures that are naturally generated and characteristic of a melt method. As a result, a high quality high molecular weight polycarbonate resin which has the low N value (structural viscosity index) and excellent color and in which increase of heterologous structures is significantly suppressed can be produced by the melt method.

The reaction conditions in Step (C) are set so that high interface renewing performance can be ensured at a high temperature in a high degree of vacuum by appropriately selecting a polymerization apparatus and a stirring blade.

The reaction temperature in the linking and high molecular weight achievement reactor of Step (C) is in the range of, for example, 240° C. to 320° C., preferably 260° C. to 310° C. and more preferably 280° C. to 310° C., and the reaction pressure is 10 torr or less (1,333 Pa or less), preferably 2.0 torr or less (267 Pa or less), more preferably 0.01 torr to 1.5 torr (1.3 Pa to 200 Pa), and even more preferably 0.01 torr to 1.0 torr (1.3 Pa to 133 Pa). Therefore, as sealing for the stirring shaft, a sealing mechanism including a mechanical seal is preferably employed.

In Step (C), it is desired that the liquid level is controlled so that the average retention time of the reaction mixture in the linking and high molecular weight achievement reaction becomes preferably 60 minutes or less, more preferably 1 minute to 60 minutes, even more preferably 5 minutes to 60 minutes, yet even more preferably 20 minutes to 60 minutes, yet even more preferably 25 minutes to 60 minutes, and particularly preferably 30 minutes to 60 minutes. Furthermore, in the reactor, phenol that is produced as a byproduct is distilled off through the distillation tube.

Note that, in the manufacturing apparatus depicted in FIG. 1, byproducts, such as phenol, are continuously recovered in a liquid state from the condensing devices 3C and 4C installed respectively on the first vertical stirring reactor 3R and the second vertical stirring reactor 4R. The condensing devices 3C and 4C individually preferably have two or more separate condensing devices, and it is preferable to reflux a part or all of the distillate, which was condensed in the condensing device closest to the reactor, to the first vertical stirring reactor 3R and the second vertical stirring reactor 4R because the control of the molar ratio for the raw materials is facilitated. Furthermore, cold traps (not shown) are provided downstream of the condensing devices 5C, 6C and 7C installed respectively on the third vertical stirring reactor 5R, the fourth vertical stirring reactor 6R and the fifth horizontal stirring reactor 7R to continuously recover byproducts in a solid state.

Note that the recovered byproducts subsequently undergo steps of hydrolysis, purification and the like, and then can be reused (recycled). Examples of main byproducts include aromatic monohydroxy compounds, such as phenol, unreacted dialcohol compounds, cyclic carbonates derived from the dialcohol compounds, and the like. In particular, after the phenol is recovered, the phenol can be recycled by being fed to a diphenyl carbonate production step. Furthermore, when cyclic carbonates derived from the dialcohol compounds are generated as byproducts, the cyclic carbonates can be similarly recovered and recycled.

Therefore, in the continuous manufacturing apparatus depicted in FIG. 1, after the internal temperatures and pressures of the five reactors have reached their respective predetermined values, the molten raw material mixture and the catalyst are continuously fed through the preheaters to initiate the melt polycondensation based on the transesterification reaction. Therefore, immediately after the start of melt polycondensation, the average retention time of the polymerization reaction solution in each reactor becomes equivalent to that at the time of the steady operation. Furthermore, low molecular weight prepolymers are linked to each other by using the dialcohol compound having a high transesterification reaction rate so that a high molecular weight is achieved in a short period of time, and therefore unnecessary heat history is not applied and it is less likely that branching occurs. Furthermore, excellent color is achieved.

EXAMPLES

The present invention is more specifically described below using examples; however, the present invention is not limited to these examples.

The measurement of values of physical properties in the examples were performed as follows.

(1) Weight average molecular weight:

The weight average molecular weight was a weight average molecular weight, measured by gel permeation chromatography (GPC) in terms of polystyrene and determined from a calibration curve prepared in advance by using polystyrene standards.

A calibration curve was first prepared by using polystyrene standards of known molecular weights (molecular weight distribution=1) ("PStQuick MP-M", manufactured by Tosoh Corporation). Based on the measured polystyrene standards, the elution time of each peak and the molecular weight value were plotted. By an approximation by using a cubic equation, a calibration curve was obtained. The weight average molecular weight (Mw) was calculated based on the following equation.

$$Mw = \Sigma(W_i \times M_i)/\Sigma(W_i)$$

Note that i is an i-th dividing point of the divisions of the molecular weights M, $W_i$ is the weight of an i-th fraction, and $M_i$ is the molecular weight of an i-th fraction. The molecular weight M is a value of the polystyrene molecular weight value at the same elution time in the calibration curve.

Measurement conditions

Instrument: HLC-8320GPC, manufactured by Tosoh Corporation

Columns: Guard column: TSKguardcolumn SuperM-PHZ-M×1

Analysis columns: TSKgel SuperMultiporeHZ-M×3

Solvent: HPLC grade chloroform

Amount of injection: 10 μL

Sample concentration: 0.2 w/v % HPLC grade chloroform solution

Solvent flow rate: 0.35 mL/min

Measurement temperature: 40° C.

Detector: RI (2) Terminal phenyl group amount and terminal phenyl group concentration:

In 1 mL of deuterated chloroform (containing 0.05 w/v % TMS), 0.05 g of a resin sample was dissolved and analyzed at 23° C. by using a nuclear magnetic resonance analyzer under the conditions shown below to measure a $^1$H-NMR spectrum, and the amount of terminal phenyl groups in the prepolymer (PP) was calculated.

Measurement Conditions

Instrument: LA-500 (500 MHz), manufactured by JEOL Ltd.

Observed nucleus: $^1$H

Relaxation delay: 1 s x_angle: 45 deg x_90 width: 20 μs x_plus: 10 μs

Scan: 500 times

Calculation Method

The amount of terminal phenyl groups and the terminal phenyl group concentration in the PP were determined from the integral ratio of the peak of terminal phenyl groups at approximately 7.4 ppm to the peak of phenylene groups (derived from a BPA skeleton) at approximately 7.0 ppm to 7.3 ppm.

(3) Terminal hydroxy group concentration:

In 1 mL of deuterated chloroform (containing 0.05 w/v % TMS), 0.05 g of a resin sample was dissolved and analyzed at 23° C. by using a nuclear magnetic resonance analyzer under the same conditions as described above to measure a $^1$H-NMR, and the terminal hydroxy group concentration (OH concentration) of each of the prepolymer (PP) and the polycarbonate (PC) having achieved a high molecular weight was measured.

Calculation

The terminal hydroxy group concentration (OH concentration) of each of the PP and the PC having achieved a high molecular weight was calculated from the integral ratio of the hydroxy group peak at 4.7 ppm to the peaks of phenyl and phenylene groups (terminal phenyl groups and BPA skeleton-derived phenylene groups) at approximately 7.0 ppm to 7.5 ppm.

(4) N value (structural viscosity index):

The N value was calculated by the following Equation.

$$N \text{ value} = (\log(Q160 \text{ value}) - \log(Q10 \text{ value}))/(\log 160 - \log 10) \quad (I)$$

Q160 value is the melt flow volume per unit time (mL/sec) measured at 280° C. and a load of 160 kg, and was measured with CFT-500D type manufactured by Shimadzu Corporation, and calculated by stroke=7.0 mm to 10.0 mm. Note that the nozzle diameter was 1 mm, and the nozzle length was 10 mm.

Q10 value is the melt flow volume per unit time (mL/sec) measured at 280° C. and a load of 10 kg, and was measured with CFT-500D type manufactured by Shimadzu Corporation, and calculated by stroke=7.0 mm to 10.0 mm. The nozzle diameter was 1 mm, and the nozzle length was 10 mm.

(5) YI value (yellowness index):

The YI value is the degree indicating how far the color is from colorless or white in the yellow direction. In 60 mL of methylene chloride, 6 g of a resin sample was dissolved, and the resultant sample in a liquid form was subjected to measurement in accordance with the JIS K7105 standards using a spectral color-difference meter (SE2000, manufactured by Nippon Denshoku Industries Co., Ltd.).

(6) Heterologous structures amount:

0.05 g of a resin sample was dissolved in 1 mL of deuterated chloroform (containing 0.05 w/v % TMS), and analyzed at 23° C. by using a nuclear magnetic resonance analyzer under the same conditions as described above to measure a $^1$H-NMR, and the amount of heterologous structures in polycarbonate (PC) having achieved a high molecular weight was measured. Specifically, according to the $^1$H-NMR identification described on p. 7659 of the document of Polymer 42 (2001) 7653-7661, from the present ratio of Ha and Hb, the amount of the heterologous structures (PSA) shown below was measured.

[Chemical Formula 12]

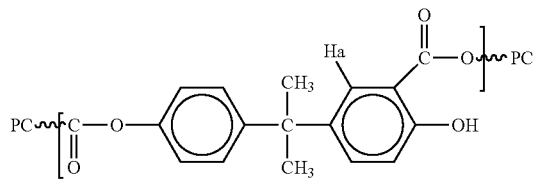

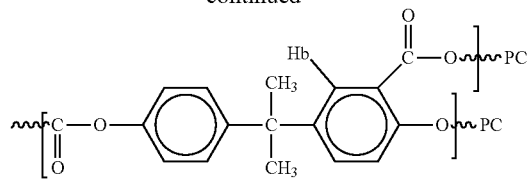

Calculation

The amount of heterologous structures was calculated from the integral ratio of the signals of Ha (approximately 8.01 ppm) and Hb (approximately 8.15 ppm) in the above heterologous structure units to the signals of phenyl and phenylene groups (terminal phenyl groups and BPA skeleton-derived phenylene groups) at approximately 7.0 ppm to 7.5 ppm.

Example 1

Using a continuous manufacturing apparatus depicted in FIG. 1 having two main raw material preparation tanks (1Ra and 1Rb), two linking agent preparation tanks (2Ra and 2Rb), four vertical stirring reactors (3R to 6R) and one horizontal stirring reactor (7R), a polycarbonate resin was produced under the following conditions.

First, in the individual reactors and preheaters, the inner temperatures and pressures shown below were in advance set according to the reaction conditions.

(Preheater 1H) 225° C.

(First vertical stirring reactor 3R)

Internal temperature: 215° C.; Pressure: 200 torr (26.6 kPa); Temperature of the heating medium: 245° C.

(Preheater 3H) 235° C.

(Second vertical stirring reactor 4R)

Internal temperature: 225° C.; Pressure: 150 torr (20 kPa); Temperature of the heating medium: 255° C.

(Preheater 4H) 245° C.

(Third vertical stirring reactor 5R)

Internal temperature: 235° C.; Pressure: 100 torr (13.3 kPa); Temperature of the heating medium: 265° C.

(Preheater 5H) 270° C.

(Fourth vertical stirring reactor 6R)

Internal temperature: 260° C.; Pressure: 0.1 torr (13.3 Pa); Temperature of the heating medium: 280° C.

A molten mixture, which was prepared, as required, by mixing diphenyl carbonate and bisphenol A (BPA) in the main raw material preparation tanks 1Ra and 1Rb under a nitrogen gas atmosphere so that the raw material molar ratio (diphenyl carbonate/bisphenol A) became 1.125, was continuously fed to the first vertical stirring polymerization tank 3R at a flow rate of 24 kg/hr, and the liquid level was maintained at a constant level while controlling the opening degree of a valve provided in a polymer discharge line at the bottom of the tank so that the average retention time in the first vertical stirring polymerization tank 3R became 60 minutes. At this time, as a catalyst, a 0.005 mol/L aqueous solution of cesium carbonate ($Cs_2CO_3$) in a proportion of $0.25 \times 10^{-6}$ mol per 1 mol of BPA (2.6 mL/hr) was added from 1Cat.

The polymerization reaction solution discharged from the bottom of the first vertical stirring reactor 3R was, subsequently, continuously fed to the second vertical stirring reactor 4R, the third vertical stirring reactor 5R, the fourth vertical stirring reactor 6R and the mixer 6Mix.

Simultaneously, in the catalyst composition preparation tanks (2Ra and 2Rb) having anchor blades, 1,000 g of a dialcohol compound (2-butyl-2-ethyl-1,3-propane glycol; BEPG; melting point: 43° C.) was charged, appropriately subjected to nitrogen purging, and heat-melted at 100° C. to 200° C. As a catalyst, 20 mL of a 0.005 mol/L aqueous solution of cesium carbonate ($Cs_2CO_3$) was added to the dialcohol compound, and the resultant mixture was subjected to dehydration treatment (final water content: 0.03 mass %) at 0.1 torr to prepare a catalyst composition.

The gas inside was sampled by inserting a gas-tight syringe in the space in the catalyst composition preparation tank and subjected to oxygen concentration measurement by using gas chromatography. As a result, the oxygen concentration was approximately 1 vol %.

The prepared catalyst composition was fed to the mixer 6Mix immediately after the dehydration treatment was performed, to bring the catalyst composition into contact with a prepolymer.

Simultaneously with feeding the prepolymer (PP) at a flow rate of 13,200 g/hr to the mixer 6Mix, the above-prepared catalyst composition having a melt viscosity of 40 P (poise) was continuously fed from the catalyst composition preparation tanks (2Ra and 2Rb) using a constant delivery pump at a flow rate of 120 g/hr (0.25 mol per 1 mol total of all the terminals of the PP (terminal-capping phenyl group amount)). At this time, the amount of the added catalyst was $0.25 \times 10^{-6}$ mol per 1 mol of the BPA constituting the prepolymer. Note that the temperature in the pre-heater 6H was 290° C., the temperature in the mixer 6Mix was 280° C. to 300° C., and the pressure was 760 torr (0.10 MPa).

The PP continuously fed to the mixer 6Mix had a weight average molecular weight (Mw) in terms of polystyrene of 30,000, a terminal phenyl group concentration of 6.0 mol %, and a terminal hydroxy group concentration of 200 ppm.

A period of time taken until the PP was subjected to the linking and high molecular weight achievement reaction (the transesterification reaction) under reduced pressure conditions after the catalyst composition was added to the PP was 3 minutes.

The PP mixture was fed from the mixer 6Mix to the fifth horizontal stirring reactor 7R at a flow rate of 13,200 g/hr. The pressure in the fifth horizontal stirring reactor 7R at this time was set to the reduced pressure conditions of 0.5 torr (66.7 Pa), but the degree of pressure reduction was the pressure as set, and operation was performed stably without fluctuations. The temperature in the apparatus was controlled to 300° C. to 320° C.

During the polymerization reaction (the linking and high molecular weight achievement reaction), the liquid level was controlled so that the average retention time in each of the vertical reactors became 60 minutes and the average retention time in the fifth horizontal stirring reactor 7R became 60 minutes, and phenol that was generated as a byproduct, simultaneously with the polymerization reaction was distilled off. The stirring blade 7Y of the fifth horizontal stirring reactor 7R was stirred at 20 rpm.

The prepolymer mixture obtained after being mixed in the mixer 6Mix had a terminal hydroxy group concentration of 2,000 ppm, and a weight average molecular weight (Mw) in terms of polystyrene of 26,500.

The weight average molecular weight (Mw) in terms of polystyrene, of the polycarbonate resin obtained after the linking and high molecular weight achievement reaction was performed in the fifth horizontal stirring reactor 7R was 61,000. Furthermore, the terminal hydroxy group concentration was 510 ppm, the N value was 1.20, the YI value was 1.5, and the heterologous structures (PSA) amount was 700 ppm.

The reactors used in Example 1 are as follows.
First to fourth vertical stirring reactors
　Manufacturer: Sumitomo Heavy Industries, Ltd.
　Material: SUS 316L electropolished
　Stirring blades: Maxblend impellers for the first to third vertical stirring reactors
　Double helical ribbon impellers for the fourth vertical stirring reactor
Catalyst composition preparation tank
　Material: SUS316
Mixer (in-line mixer)
　S1KRC Reactor, manufactured by Kurimoto, Ltd.
　Size: L/D=10.2; Body effective volume=0.12 L
Liquid transfer pump for the catalyst composition
　Continuous non-pulsation metering pump, manufactured by Fuji Techno
　Industries Corporation
Transfer tube
　Material: SUS316
　Structure: Duplex tube
Fifth horizontal stirring reactor
　Manufacturer: Hitachi, Ltd.
　Type of apparatus: Spectacle-shaped blade polymerizer; effective volume=13 L
　Material: SUS 316L electropolished
　Discharge apparatus: Screw-type extractor
　Method for adjusting the oxygen concentration in the reactor: Pressured devolatilization by purging with nitrogen Note that the retention time of the reaction mixture is an average retention time of the reaction mixture from the supply port for the aromatic polycarbonate prepolymer on the horizontal stirring reactor to the outlet for the produced high molecular weight polycarbonate resin.

Example 2

A high molecular weight aromatic polycarbonate resin was produced by the same manner as in Example 1 except for changing the procedure and the time as follows: in the preparation of the catalyst composition and the mixing with the prepolymer in Example 1, after the dialcohol compound and the catalyst were charged into the catalyst composition preparation tanks (2Ra and 2Rb), heat-melted, mixed and subjected to the dehydration treatment, the resultant mixture was maintained at the same temperature, and then the resultant mixture was fed to be brought into contact with the prepolymer 9 hours after the preparation of the mixture. That is, the conditions except the time from the preparation of the catalyst composition to the start of the supply were the same as those of Example 1.

Example 3

A high molecular weight aromatic polycarbonate resin was produced by the same manner as in Example 1 except for controlling the temperature of the catalyst composition preparation tanks (2Ra and 2Rb) to 75° C. to 80° C. in the preparation of the catalyst composition in Example 1. That is, the conditions except the temperature settings of the catalyst composition preparation tanks were the same as those of Example 1.

Example 4

A high molecular weight aromatic polycarbonate resin was produced by the same manner as in Example 1 except for controlling the temperature of the catalyst composition preparation tanks (2Ra and 2Rb) to 200° C. to 210° C. in the preparation of the catalyst composition in Example 1. That is, the conditions except the temperature settings of the catalyst composition preparation tanks were the same as those of Example 1.

Comparative Example 1

A high molecular weight aromatic polycarbonate resin was produced by the same manner as in Example 3 except for changing the procedure and the time as follows: in the preparation of the catalyst composition and the mixing with the prepolymer in Example 3, after the dialcohol compound and the catalyst were charged into the catalyst composition preparation tanks (2Ra and 2Rb), heat-melted, mixed and subjected to the dehydration treatment, the resultant mixture was maintained at the same temperature, and then the resultant mixture was fed to be brought into contact with the prepolymer 24 hours after the preparation of the mixture. That is, the conditions were the same as those of Example 1 except for changing the preparation temperature and the retention temperature of the catalyst composition to 75° C. to 80° C. and changing the time from the preparation of the catalyst composition to the start of the supply to 24 hours.

In the high molecular weight aromatic polycarbonate obtained in Comparative Example 1, color that was visually recognizable was observed.

Comparative Example 2

It was attempted to produce a high molecular weight aromatic polycarbonate resin by the same production conditions as in Example 1 except for changing the procedure and the time as follows: in the preparation of the catalyst composition and the mixing with the prepolymer in Example 1, after the dialcohol compound and the catalyst were charged into the catalyst composition preparation tanks (2Ra and 2Rb) in which the temperature was controlled to 30° C. to 40° C., heat-melted, mixed and subjected to the dehydration treatment, the resultant mixture was maintained at the same temperature, and then the resultant mixture was fed to be brought into contact with the prepolymer 12 hours after the preparation of the mixture.

In the production conditions of Comparative Example 2, blockage of the catalyst composition occurred in the transfer tube, and the operation was not possible.

Comparative Example 3

It was attempted to produce a high molecular weight aromatic polycarbonate resin by the same production conditions as in Example 1 except for changing the procedure and the time as follows: in the preparation of the catalyst composition and the mixing with the prepolymer in Example 1, after the dialcohol compound and the catalyst were charged into the catalyst composition preparation tanks (2Ra and 2Rb) in which the temperature was controlled to 300° C. to 310° C., heat-melted, mixed and subjected to the dehydration treatment, the resultant mixture was maintained at the same temperature, and then the resultant mixture was fed to be brought into contact with the prepolymer 12 hours after the preparation of the mixture.

In the production conditions of Comparative Example 3, pressure fluctuation in the transfer tube of the catalyst composition was significant, and the operation was not possible. It is conceived that, for example, this is because of fluctuation of the liquid-feeding pressure due to boiling and vaporization of the catalyst composition.

Comparative Example 4

It was attempted to produce a high molecular weight aromatic polycarbonate resin by the same production conditions as in Example 1 except for changing the procedure and the time as follows: in the preparation of the catalyst composition and the mixing with the prepolymer in Example 1, after the dialcohol compound and the catalyst were charged into the catalyst composition preparation tanks (2Ra and 2Rb) in which the temperature was controlled to 75° C. to 80° C., heat-melted and mixed to obtain the catalyst composition without performing the dehydration treatment, the resultant mixture was retained at the same temperature for 12 hours, and then feeding was started.

In the production conditions of Comparative Example 4, pressure fluctuation in the transfer tube of the catalyst composition was significant, and the operation was not possible. It is conceived that, for example, this is because of fluctuation of the liquid-feeding pressure due to oxidation decomposition and vaporization of the catalyst composition.

The results of these are shown in the table below.

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Production conditions | Temperature of the catalyst composition preparation tank (° C.) | 100~200 | 100~200 | 75~80 | 200~210 | 75~80 | 30~40 | 300~310 | 75~80 |
| | Time until start of feeding to mixer 6Mix (hr) | 0 | 9 | 0 | 0 | 24 | 12 | 12 | 12 |
| | Presence/absence of dehydration treatment of the catalyst composition | Present | Present | Present | Present | Present | Present | Present | Absent |
| Obtained resin data | Mw | 61,000 | 58,000 | 60,000 | 58,000 | 50,000 | Operation was not possible | Operation was not possible | Operation was not possible |
| | OH concentration (ppm) | 510 | 430 | 350 | 320 | 650 | | | |
| | N value | 1.20 | 1.22 | 1.21 | 1.22 | 1.23 | | | |
| | YI value | 1.5 | 1.6 | 1.1 | 1.1 | 2.0 | | | |
| | Heterologous structures (PSA) amount (ppm) | 700 | 600 | 400 | 500 | 1,200 | | | |

INDUSTRIAL APPLICABILITY

According to the manufacturing method of the present invention, in the manufacturing method for a high molecular weight aromatic polycarbonate resin including a step of subjecting the aromatic polycarbonate prepolymer and the dialcohol compound to the linking and high molecular weight achievement reaction, a high molecular weight aromatic polycarbonate resin that has excellent color, a sufficient molecular weight, a low N value (structural viscosity index) and an excellent quality in fluidity can be economically advantageously produced. Furthermore, in the obtained high molecular weight aromatic polycarbonate resin, generation of heterologous structures is efficiently suppressed.

EXPLANATION OF REFERENCE NUMERALS

1Ra and 1Rb: Raw material mixing tanks; 2Ra and 2Rb: Linking agent preparation apparatuses; 3R: First vertical stirring reactor; 4R: Second vertical stirring reactor; 5R: Third vertical stirring reactor; 6R: Fourth vertical stirring reactor; 6Mix: Mixer; and 7R: Fifth horizontal stirring reactor.

The invention claimed is:

1. A manufacturing method for a high molecular weight aromatic polycarbonate resin, the method comprising:
    a step of mixing a dialcohol compound represented by General Formula (1) below and a catalyst to produce a catalyst composition in a liquid form,
    a step of mixing the catalyst composition in a liquid form and an aromatic polycarbonate prepolymer within a period of 10 hours from the time of production of the catalyst composition, to obtain a prepolymer mixture, and
    a high molecular weight achievement step of heat-treating the obtained prepolymer mixture under reduced pressure conditions to obtain a high molecular weight aromatic polycarbonate resin;

[Chemical Formula 1]

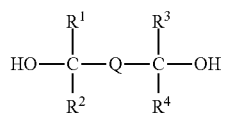

(1)

wherein, $R^1$ to $R^4$ each independently represent a hydrogen atom, a halogen atom, or a linear or branched alkyl group having 1 to 5 carbons, and Q represents a single bond or a substituted or unsubstituted divalent group comprising at least one member selected from the group consisting of an aliphatic hydrocarbon group, an aromatic hydrocarbon group, an oxygen atom, a sulfur atom, a sulfone group, a sulfoxide group, a carbonyl group, a dialkylsilyl group and a diarylsilyl group.

2. The manufacturing method according to claim 1, wherein the step of producing the catalyst composition is performed separately in parallel in a plurality of catalyst composition preparation tanks.

3. The manufacturing method according to claim 1, wherein a molten state of the catalyst composition is maintained in a temperature range from a temperature that is 5° C. higher than a melting point of the dialcohol compound to a temperature that is 250° C. higher than the melting point.

4. The manufacturing method according to claim 1, wherein the catalyst is at least one member selected from the group consisting of alkali metal salts and alkaline earth metal salts.

5. The manufacturing method according to claim 1, wherein the step of producing the catalyst composition is performed in a catalyst composition preparation tank comprising a surface in contact with the catalyst composition, and the surface has an iron content of 80 mass % or less.

6. The manufacturing method according to claim 1, wherein the step of producing the catalyst composition is performed in an atmosphere having an oxygen content of 10 vol % or less.

7. The manufacturing method according to claim 2, wherein a molten state of the catalyst composition is maintained in a temperature range from a temperature that is 5° C. higher than a melting point of the dialcohol compound to a temperature that is 250° C. higher than the melting point.

8. The manufacturing method according to claim 2, wherein the catalyst is at least one member selected from the group consisting of alkali metal salts and alkaline earth metal salts.

9. The manufacturing method according to claim 2, wherein the step of producing the catalyst composition is performed in a catalyst composition preparation tank comprising a surface in contact with the catalyst composition, and the surface has an iron content of 80 mass % or less.

10. The manufacturing method according to claim 2, wherein the step of producing the catalyst composition is performed in an atmosphere having an oxygen content of 10 vol % or less.

11. The manufacturing method according to claim 3, wherein the catalyst is at least one member selected from the group consisting of alkali metal salts and alkaline earth metal salts.

12. The manufacturing method according to claim 3, wherein the step of producing the catalyst composition is performed in a catalyst composition preparation tank comprising a surface in contact with the catalyst composition, and the surface has an iron content of 80 mass % or less.

13. The manufacturing method according to claim 3, wherein the step of producing the catalyst composition is performed in an atmosphere having an oxygen content of 10 vol % or less.

14. The manufacturing method according to claim 7, wherein the catalyst is at least one member selected from the group consisting of alkali metal salts and alkaline earth metal salts.

15. The manufacturing method according to claim 4, wherein the step of producing the catalyst composition is performed in a catalyst composition preparation tank comprising a surface in contact with the catalyst composition, and the surface has an iron content of 80 mass % or less.

16. The manufacturing method according to claim 4, wherein the step of producing the catalyst composition is performed in an atmosphere having an oxygen content of 10 vol % or less.

17. The manufacturing method according to claim 7, wherein the step of producing the catalyst composition is performed in a catalyst composition preparation tank comprising a surface in contact with the catalyst composition, and the surface has an iron content of 80 mass % or less.

18. The manufacturing method according to claim 7, wherein the step of producing the catalyst composition is performed in an atmosphere having an oxygen content of 10 vol % or less.

19. The manufacturing method according to claim 8, wherein the step of producing the catalyst composition is performed in a catalyst composition preparation tank comprising a surface in contact with the catalyst composition, and the surface has an iron content of 80 mass % or less.

20. The manufacturing method according to claim 8, wherein the step of producing the catalyst composition is performed in an atmosphere having an oxygen content of 10 vol % or less.

* * * * *